United States Patent
Asano et al.

(10) Patent No.: US 7,536,522 B2
(45) Date of Patent: May 19, 2009

(54) COMPUTER SYSTEM FOR COPYING DATA BETWEEN VIRTUAL STORAGE AREAS

(75) Inventors: Masayasu Asano, Yokohama (JP); Yuichi Taguchi, Sagamihara (JP); Naoko Maruyama, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 205 days.

(21) Appl. No.: 11/399,651

(22) Filed: Apr. 7, 2006

(65) Prior Publication Data

US 2007/0198790 A1 Aug. 23, 2007

(30) Foreign Application Priority Data

Feb. 21, 2006 (JP) .............................. 2006-044016

(51) Int. Cl.
*G06F 12/00* (2006.01)
(52) U.S. Cl. ............... 711/162; 711/100; 711/114; 711/154; 711/156; 711/161
(58) Field of Classification Search ............... None
See application file for complete search history.

(56) References Cited

U.S. PATENT DOCUMENTS

2003/0191904 A1* 10/2003 Iwami et al. ............... 711/147

2005/0144384 A1 6/2005 Eguchi et al.

FOREIGN PATENT DOCUMENTS

JP 2005-209149 8/2005

* cited by examiner

*Primary Examiner*—Reginald G Bragdon
*Assistant Examiner*—Shawn X Gu
(74) *Attorney, Agent, or Firm*—Antonelli, Terry, Stout & Kraus, LLP.

(57) ABSTRACT

It has been impossible in prior art to copy every piece of data that is stored in a virtual volume. A management computer of this invention receives a copy request that designates a real storage area as a copy source, selects a virtual storage area that is associated with plural real storage areas as a copy destination virtual storage area, and judges whether or not a copy source virtual storage area and the copy destination virtual storage area are allocated to real storage areas. Based on a result of the judging, the management computer gives an instruction to copy data that is stored in the copy source real storage area to a copy destination real storage area, and keeps information about a replication relation between the copy source real storage area and the copy destination real storage area on which the data copy has been performed.

16 Claims, 19 Drawing Sheets

| VIRTUAL VOLUME ID | REAL VOLUME ID | ALLOCATED/ NOT ALLOCATED |
|---|---|---|
| VOL1 | VOL5 | ALLOCATED |
| VOL1 | VOL6 | NOT ALLOCATED |
| VOL2 | VOL7 | ALLOCATED |
| VOL2 | VOL8 | NOT ALLOCATED |
| VOL3 | VOL9 | ALLOCATED |
| VOL3 | VOL10 | NOT ALLOCATED |
| VOL4 | VOL11 | ALLOCATED |
| VOL4 | VOL12 | NOT ALLOCATED |
| VOL13 | VOL14 | ALLOCATED |
| VOL13 | VOL15 | NOT ALLOCATED |
| VOL13 | VOL16 | NOT ALLOCATED |
| VOL13 | VOL7 | NOT ALLOCATED |

*FIG. 5*

COMPUTER SYSTEM FOR COPYING DATA BETWEEN VIRTUAL STORAGE AREAS

CLAIM OF PRIORITY

The present application claims priority from Japanese patent application P2006-044016 filed on Feb. 21, 2006, the content of which is hereby incorporated by reference into this application.

BACKGROUND

This invention relates to a computer or a computer system using a storage, and more particularly, to a computer system for executing copy processing of data in a storage area of a storage.

Computer systems employed in business and other organizations are using more and more volumes as storage areas for storing data. The reasons behind this include increasing data capacity of the storage and prolonged data preservation period.

A computer and storage in a computer system can set only a limited count of volumes, which could hinder the computer system from providing as many volumes as necessary.

A known solution to this problem is to improve the volume utilization efficiency by setting, canceling, and switching the allocation of plural volumes in an actual storage, or plural volumes in a different storage which is connected to the former storage, without changing volume identification information (e.g., WWW: World Wide Name or LUN: Logical Unit Number) that is recognized by the computer (refer to JP 2005-209149 A).

This volume allocation technique includes switching between volumes in the same storage and switching from a volume in the storage to a volume in a different storage which is connected to the former storage.

The volume of the different storage connected to the storage in the latter method is called a real volume. A volume to which a real volume is allocated as its substance and which constitutes the unit of management within the storage will hereinafter be called a virtual volume.

SUMMARY

According to the related art, volume replication in the same storage or between different storage systems for the purpose of, e.g., data backup requires designating a copy source volume and a copy destination volume by volume identification information, or by volume IDs which enable the storage that executes the volume replication to identify the copy source volume and the copy destination volume.

A virtual volume is usually associated with plural real volumes. A real volume being in association with a virtual volume means a real volume being connected to a virtual volume so that the virtual volume can be allocated to the real volume.

A virtual volume is allocated to its associated real volumes one at a time, and the allocation is switched from one real volume to another periodically. While a virtual volume is allocated to a real volume, data requested by a host to be written in the virtual volume is stored in the real volume.

For instance, consider a case in which data of a real volume is copied to another real volume, and the copy source volume and the copy destination volume are designated by identification information or volume IDs. The copy destination real volume in this case can store a copy of data in the designated real volume alone and cannot store a copy of data in other real volumes associated with a virtual volume that the copy source real volume is associated with. In short, it has been impossible to copy every piece of data in a virtual volume.

To copy every piece of data in a virtual volume with prior art, copy operation settings have to be set in each real volume that is associated with the virtual volume.

According to a representative aspect of this invention, a computer system includes: at least one first storage system; at least one second storage system connected to the first storage system; a host computer; and a management computer which manages the first storage system and the second storage system, and is characterized in that: the first-storage system has a first interface for connecting with the second storage system, a first processor connected to the first interface, and a real storage area for storing data that is requested to be written in a virtual storage area set in the second storage system; the second storage system has a second interface for connecting with the host computer and the first storage system, a second processor connected to the second interface, and a second memory connected to the second processor to provide the host computer with the virtual storage area in which data is written; the virtual storage area is associated with the real storage area; when allocated to the virtual storage area, the real storage area stores data that is requested to be written in the allocated virtual storage area; the management computer has a third interface connected to the first storage system and the second storage system, a third memory connected to the third interface, and a third processor; and upon receiving a copy request that designates the real storage area as a copy source, the third processor selects one virtual storage area that is associated with plural real storage areas as a copy destination virtual storage area, judges whether or not a copy source virtual storage area and the copy destination virtual storage area are allocated to real storage areas, gives, based on a result of the judging, an instruction to copy data that is stored in the copy source real storage area to a copy destination real storage area, and keeps, in the third memory, information about a replication relation between the copy source real storage area and the copy destination real storage area on which the data copy has been performed.

According to the representative embodiment of this invention, copy processing can be executed separately for each real volume that is connected to a virtual storage area.

BRIEF DESCRIPTION OF THE DRAWINGS

The present invention can be appreciated by the description which follows in conjunction with the following figures, wherein:

FIG. 5 is a configuration diagram of a real volume table according to the first embodiment of this invention;

DETAILED DESCRIPTION OF THE PREFERRED EMBODIMENTS

Embodiments of this invention will be described below with reference to the accompanying drawings.

First Embodiment

A first embodiment of this invention will be described with reference to FIG. 1 to FIG. 9.

Figure 1:
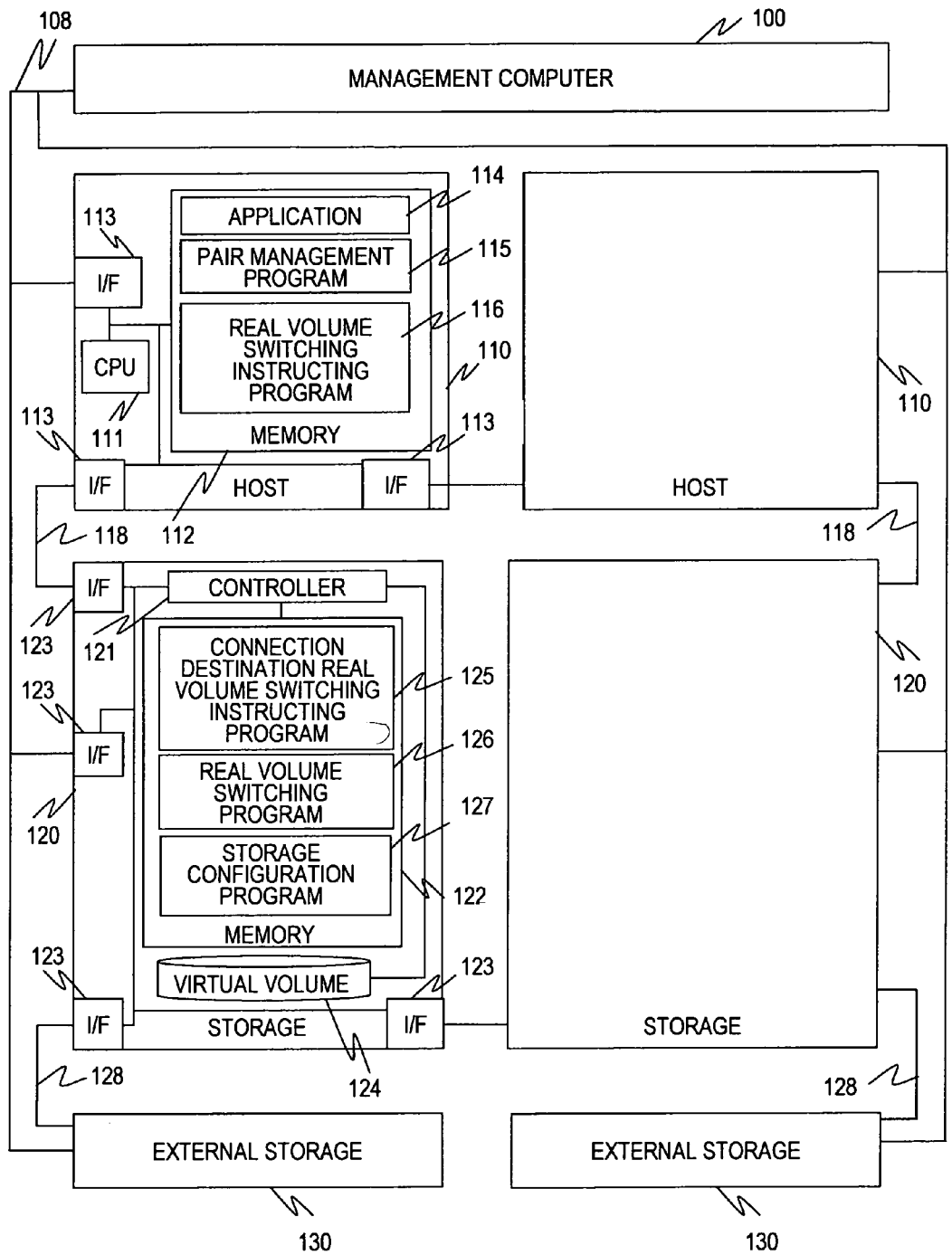
FIG. 1 is a configuration diagram showing a computer system according to a first embodiment of this invention.

FIG. 1 is a configuration diagram showing a computer system according to the first embodiment of this invention.

The computer system comprises a management computer 100, a host computer 110, a storage system 120, and an external storage system 130.

The management computer 100, the host computer 110, the storage system 120, and the external storage system 130 are connected to one another through a first connection 108. Communications through the first connection 108 follow a communication protocol such as IP (Internet Protocol). The host computer 110 and the storage system 120 are connected to each other through a second connection 118. The storage system 120 and the external storage system 130 are connected to each other through a third connection 128. Communications through the second connection 118 and the third connection 128 follow a communication protocol that is suitable for data transfer, for example, FC (Fibre Channel).

One host computer 110 is connected to another host computer 110. One storage system 120 is connected to another storage system 120.

The first connection 108, the second connection 118, and the third connection 128 may employ the same communication protocol. Networks of the same type may be employed as the first connection 108, the second connection 118, and the third connection 128.

The storage system 120 comprises a controller 121, a memory 122, an interface (I/F) 123, and a virtual volume 124.

The controller 121 is connected to the memory 122, the interface 123, and the virtual volume 124. The controller 121 comprises processor which executes various programs stored in the memory 122, thereby communicating with the external storage system 130 and controlling the storage system 120. The memory 122 stores a connection destination real volume switching instructing program 125, a real volume switching program 126, and a storage configuration program 127.

When the virtual volume 124 is paired with another virtual volume 124 in a different storage system 120 forming a copy pair, the connection destination real volume switching instructing program 125 gives an instruction to make a switch between real volumes 134 that are associated with the other virtual volume 124. The storage system 120 does not need the connection destination real volume switching instructing program 125 in the case where a switch between the real volumes 134 associated with the copy destination virtual volume 124 is made by a real volume switching instructing program 104 or a real volume switching instructing program 116.

The real volume switching program 126 is a program that allocates the virtual volume 124 to one real volume 134 selected, when there are plural volumes to choose from, to be used as the virtual volume 124 out of plural real volumes 134 that are the substance of the virtual volume 124.

The storage configuration program 127 is a program that manages the configuration of the storage system 120. The storage configuration program 127 comprises a function of making the host computer 110 recognize the virtual volume 124 via the interface 123, and a function of associating the virtual volume 124 with the real volume 134 that serves as the substance of this virtual volume 124.

The interface 123 handles data I/O related to data read/write requests sent from the host computer 110 and data I/O related to data transfer to and from the external storage system 130, and communicates with the management computer 100 and others. The storage system 120 of this embodiment comprises more than one interface 123. One interface 123 is provided for each different type of communication protocol (for instance, one interface 123 for communications with the management computer 100 where IP (Internet Protocol) is employed and another interface 123 for data I/O to and from the host computer 110 where the FC (Fibre Channel) protocol is employed). Alternatively, plural interfaces 123 may be provided for each different use or different setting, irrespective of whether the protocol type differs or not (for example, one interface 123 for communications with the management computer 100, another interfaces 123 for communications with the host computer 110, and still another interface 123 for communications with the external storage system 130).

In the case where the same protocol is used in the connections from the storage system 120 to the computers and to the external storage, the storage system 120 needs only one interface 123.

To be specific, the storage system 120 of this embodiment comprises, as the interfaces 123, an interface connected to the first connection 108 for communications with the management computer 100, an interface connected to the second connection 118 for communications with the host computer 110, an interface connected to the third connection 128 for communications with the external storage system 130, and an interface for communications with another storage system 120.

The virtual volume 124 is a storage area for storing data operated by the host computer 110. The substance of the virtual volume 124 is the real volume 134, which is in the external storage system 130.

The storage system 120 may be a storage that comprises the virtual volume 124 but not a real storage medium, or may be a storage that comprises a hard disk drive storage medium in addition to the virtual volume 124. The storage system 120 may have plural hard disk drives to provide logical volumes arranged into a RAID configuration. In an application as a backup system or the like, the storage system 120 may have a removable medium such as a tape or a DVD for taking a backup of data. In short, the storage system 120 may have a volume similar to the real volume 134 of the external storage system 130.

Figure 2:
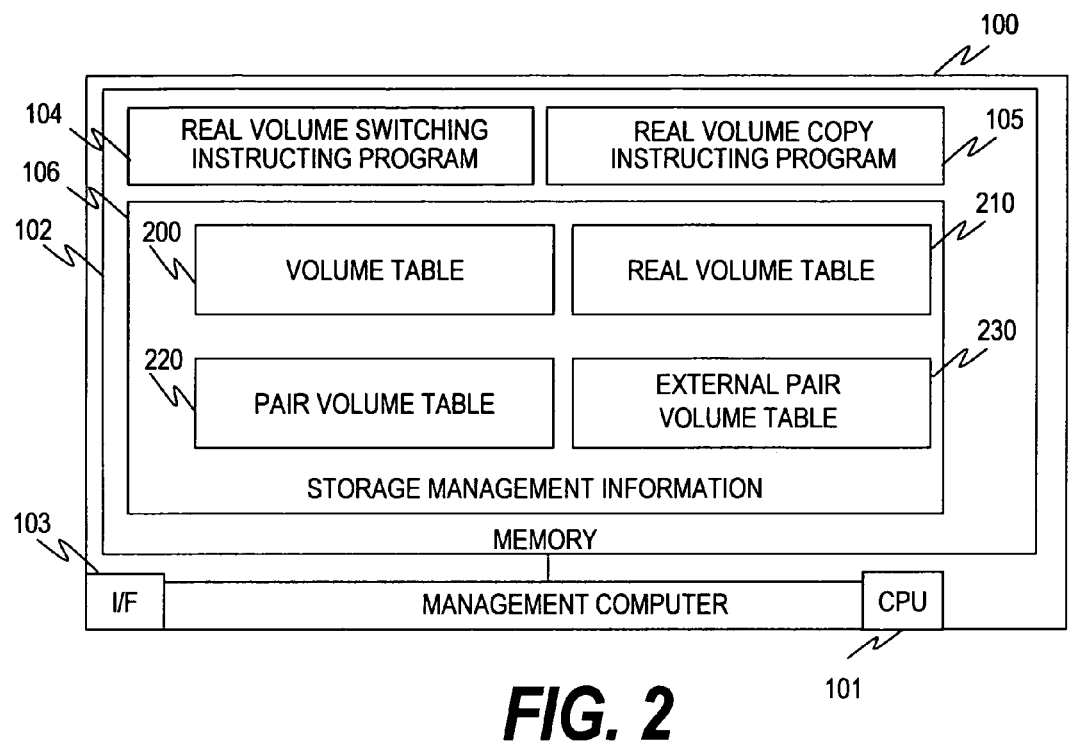
FIG. 2 is a block diagram showing a management computer according to the first embodiment of this invention.

FIG. 2 is a block diagram of the management computer 100 according to the first embodiment of this invention.

The management computer 100 comprises a CPU 101, a memory 102, and an interface (I/F) 103.

The CPU 101 is-connected to the memory 102 and the interface 103. The CPU 101 executes various programs stored in the memory 102. The memory 102 stores the real volume switching instructing program 104, a real volume copy instructing program 105, and storage management information 106.

The real volume switching instructing program 104 is a program that switches allocation of virtual volume 124 to real volume 134. The real volume copy instructing program 105 is a program that instructs pair operation processing. The storage management information 106 includes a volume table 200, a real volume table 210, a pair volume table 220, and an external pair volume table 230. The storage management information 106 is used by the real volume switching instructing program 104 and the real volume copy instructing program 105.

The interface 103 is an interface connected to the first connection 108 for communicating management commands and management information with the host computer 110, the storage system 120, and the external storage system 130.

The host computer 110 will be described next with reference to FIG. 1.

The host computer 110 comprises a CPU 111, a memory 112, and an interface 113, which handles data I/O to and from the virtual volume 124 of the storage system. 120. Data sent and received through the interface 113 is stored and edited for use in running an application program 114, for use by the application program 114, and the like.

The CPU 111 is connected to the memory 112 and the interface 113. The CPU 111 executes various programs stored in the memory 112. The memory 112 stores the application program 114, a pair management program 115, and the real volume switching instructing program 116.

The application program 114 is a program that executes a service provided by the host computer 110. The application program 114 may be a program that executes data management for updating and creating data in the virtual volume 124, backup management for copying data that is stored in the storage system 120, and the like.

The pair management program 115 is a program that manages volume copy and volume recovery in cooperation with the storage configuration program 127 of the storage system 120 and the pair management program 115 of another host computer 110.

The real volume switching instructing program 116 is a program that instructs to switch volume allocation between the real volumes 134 of the external storage system 130 of a virtual volume 124 used by the application program 114 of the host computer 110. When the virtual volume 124 is paired with another virtual volume 124 in a different storage forming a copy pair, the real volume switching instructing program 116 gives an instruction to make a switch between the real volumes 134 associated with the other virtual volume 124. The real volume switching instructing program 116 has functions equal to those of the real volume switching instructing program 104 of the management computer 100.

The interface 113 sends data read/write requests, exchanges data related to data read/write requests, and communicates with the management computer 100 as well as other components. The host computer 110 of this embodiment comprises more than one interface 113. To be specific, the host computer 110 of this embodiment comprises, as the interfaces 113, an interface that is connected to the first connection 108 and uses a TCP/IP protocol for communications with the management computer 100, an interface that is connected to the second connection 118 and uses a Fibre Channel protocol for communications with the storage system 120, and an interface for communications with another host computer 110.

In the case where the same protocol is used in the connections from the host computer 110 to the computers and to the storage, the host computer 110 needs only one interface 113. However, employing the same protocol does not always keep the host computer 110 from having different interfaces for different uses, and separate interfaces may be provided for communications with the management computer 100, for communications with another host computer 110, and for communications with the storage system 120.

Figure 3:
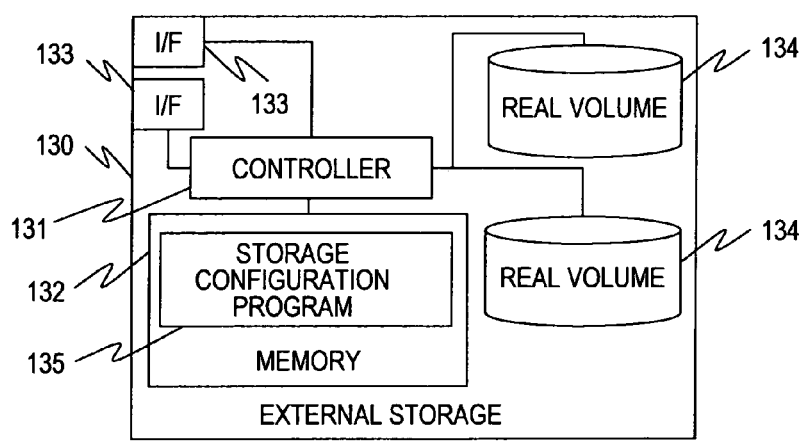
FIG. 3 is a block diagram of an external storage according to the first embodiment of this invention.

FIG. 3 is a block diagram of the external storage system 130 according to the first embodiment of this invention.

The external storage system 130 comprises a controller 131, a memory 132, an interface 133, and the real volume 134.

The controller 131 is connected to the memory 132, the interface 133, and the real volume 134.

The controller 131 executes various programs stored in the memory 132. The memory 132 stores a storage configuration program 135.

The storage configuration program 135 is a program that manages the configuration of the external storage system 130. The storage configuration program 135 has a function of making that the host computer 110 and the storage system 120 recognize the real volume 134 via the interface 133.

The interface 133 handles data I/O related to data read and written in the real volume 134, and communicates with the management computer 100 and other components. The external storage system 130 of this embodiment comprises more than one interface 133. To be specific, the external storage system 130 of this embodiment comprises, as the interfaces 133, an interface that is connected to the first connection 108 and uses a TCP/IP protocol for communications with the management computer 100, and an interface that is connected to the third connection 128 and uses a Fibre Channel protocol for communications with the storage system 120.

In the case where the same protocol is used in the connections from the external storage system 130 to the computer and to the storage, the external storage system 130 needs only one interface 133. However, employing the same protocol does not always keep the external storage system 130 from having different interfaces for different uses, and separate interfaces may be provided for communications with the management computer 100, for communications with the host computer 110, and for communications with the storage system 120.

The real volume 134 has the same configuration of the volume that is used in the storage system 120 which manages the virtual volume 124. The real volume 134 is used as a volume for storing and managing data that is used by the host computer 110 and other components. The real volume 134 may also be used as a storage area to store data that is sent from the host computer 110.

When the real volume 134 is connected to the virtual volume 124 so that it can be allocated to the virtual volume 124, the real volume 134 is associated with the virtual volume 124.

Data requested by the host computer 110 to be written in the virtual volume 124 is stored in the real volume 134 while the real volume 134 is allocated to the virtual volume 1-24.

The real volume 134 is provided by, for example, a hard disk drive. In this case, the external storage system 130 is a storage system with a hard disk. The real volume 134 may be a logical volume obtained by arranging hard disk drives into a RAID configuration. The external storage system 130 in this case is a RAID device.

The real volume 134 may be provided by a removable medium for data backup such as a tape or a DVD. The external storage system 130 in this case may be a tape library which automatically switches tapes as removable media, or a DVD library which automatically changes DVD media. "Allocating" the real volume 134 to the virtual volume 124 means connecting the real volume 134 to the virtual volume 124 logically. Data requested by the host computer 110 to be written in the virtual volume 124 cannot be stored in the real volume 134 when the real volume 134 is not allocated to the virtual volume 124.

The external storage system 130 may have the same configuration as the storage system 120. Alternatively, the external storage system 130 may be a storage whose storage configuration program 135 does not have the function of managing the virtual volume 124 with the use of the real volume 134.

Figure 4:
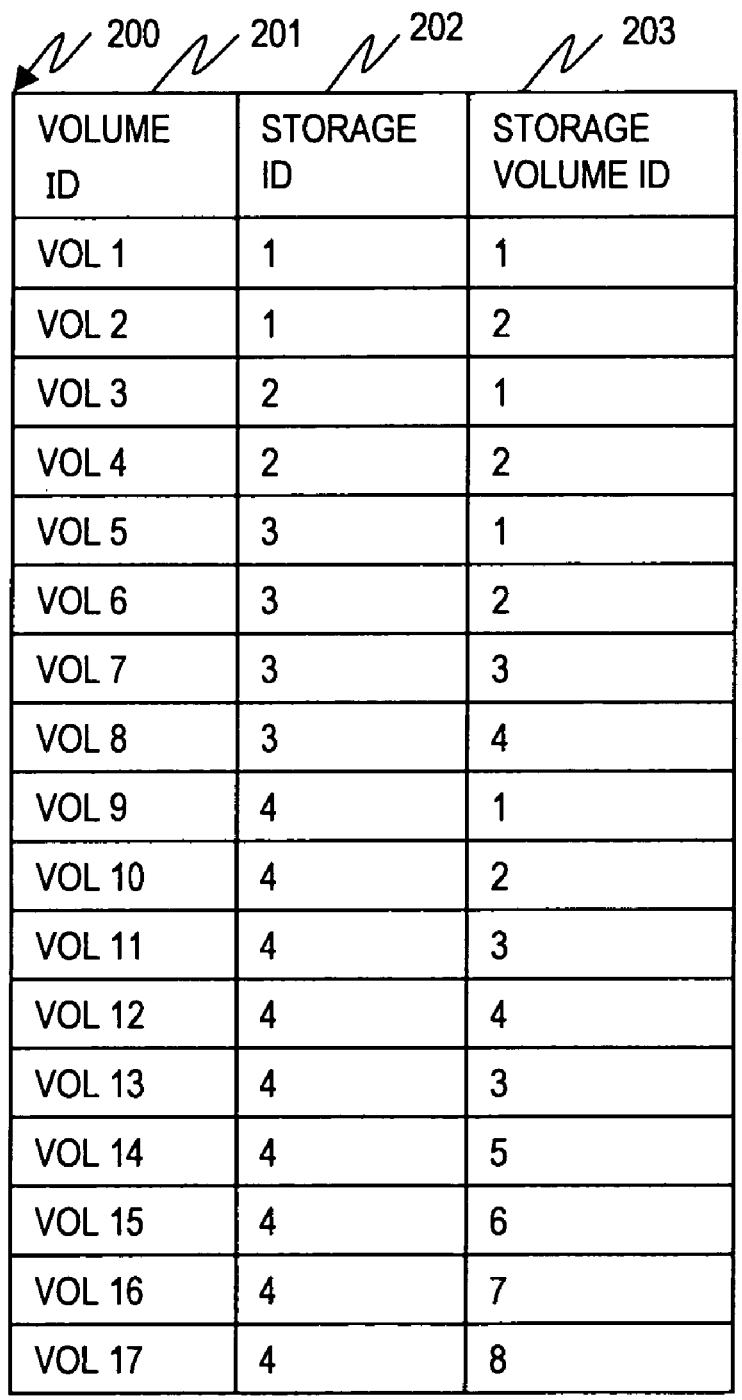
FIG. 4 is a configuration diagram of a volume table according to the first embodiment of this invention.

FIG. 4 is a configuration diagram of the volume table 200 according to the first embodiment of this invention.

The volume table 200 includes a volume ID 201, a storage ID 202, and a storage volume ID 203.

The volume ID 201 indicates an identifier unique to a volume (the term "volume" here includes the virtual volume 124 and the real volume 134). The storage ID 202 indicates an identifier unique to a storage (the term "storage" here includes the storage system 120 and the external storage system 130). The storage volume ID 203 indicates an identifier unique to a volume of the storage.

A volume having a storage ID "1" or "2" (VOL1 to VOL4 and VOL13) is the virtual volume 124. A volume having a storage ID "3" or "4" (VOL5 to VOL12 and VOL14 to VOL17) is the real volume 134.

The volume table 200 may include an ID (WWN or the like) of each interface recognizable to the host computer 110 and a volume number (LUN) set to each interface. The volume table 200 with I/F IDs and volume numbers is convenient when a single volume is connected to plural interfaces.

FIG. 5 is a configuration diagram of the real volume table 210 according to the first embodiment of this invention.

The real volume table 210 includes a virtual volume ID 211, a real volume ID 212, and volume allocating information 213.

The virtual volume ID 211 indicates an identifier that is unique to each virtual volume 124 and is identical to the one stored as the volume ID 201 in the volume table 200. The real volume ID 212 indicates an identifier that is unique to each real volume 134 and is identical to the one stored as the volume ID 201 in the volume table 200. As the volume allocating information 213, "allocated" is written when the real volume 134 is allocated to the virtual volume 124 and "not allocated" is written when the real volume 134 is not allocated to the virtual volume 124.

For instance, referring to the real volume table 210 disclosed in FIG. 5, VOL1 is a virtual volume of the real volumes VOL5 and VOL6, which means that the real volumes VOL5 and VOL6 are associated with the virtual volume (VOL1). The real volume (VOL5) is actually allocated to the virtual volume (VOL1) since "allocated" is written as the volume allocating information 213 in the entry for the real volume (VOL5). Accordingly, data requested by the host computer 110 to be written in the virtual volume (VOL1) is written in the real volume (VOL5).

The real volume (VOL6), on the other hand, is associated with the virtual volume (VOL1) but is not actually allocated to VOL1 since "not allocated" is written as the volume allocating information 213 in the entry for the real volume (VOL6). Accordingly, data requested by the host computer 110 to be written in the virtual volume (VOL1) is not written in the real volume (VOL6).

VOL6 is not allocated as a real volume to VOL1 as long as VOL5 is allocated to VOL1. In short, only one real volume 134 is allocated to one virtual volume 124 at a time.

When VOL6 is allocated to VOL1, "allocated" is recorded as the volume allocating information 213 in the entry for the real volume (VOL6), while "not allocated" is recorded as the volume allocating information 213 in the entry for the real volume (VOL5).

Figure 6:
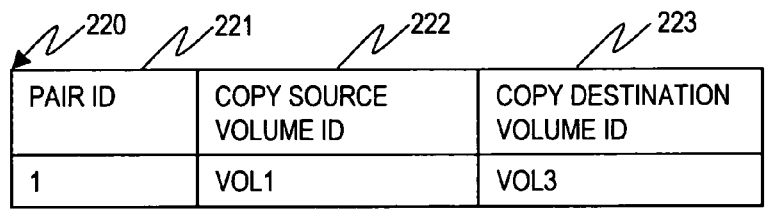
FIG. 6 is a configuration diagram of a pair volume table according to the first embodiment of this invention.

FIG. 6 is a configuration diagram of the pair volume table 220 according to the first embodiment of this invention.

The pair volume table 220 is a table that holds the IDs of a copy source volume and a copy destination volume between which copy processing in question is executed. The pair volume table 220 is used by the real volume copy instructing program 105 to keep the relation between the virtual volume 124 or the real volume 134 that serves as a copy source and the virtual volume 124 or the real volume 134 that serves as a copy destination after the copy processing is finished.

The pair volume table 220 includes a pair ID 221, a copy source volume ID 222, and a copy destination volume ID 223.

The pair ID 221 indicates an identifier unique to each pair composed of a copy source volume and a copy destination volume. The copy source volume ID 222 indicates the volume ID of the virtual volume 124 that serves as a copy source. The copy destination volume ID 223 indicates the volume ID of the virtual volume 124 that serves as a copy destination.

Volume IDs stored as the copy source volume ID 222 and the copy destination volume ID 223 are identical to those stored as the volume ID 201 in the volume table 200. Volume IDs stored as the copy source volume ID 222 and the copy destination volume ID 223 can be the IDs of the virtual volumes 124 or the IDs of the real volumes 134. Also, information of a pair composed of the virtual volume 124 and a normal volume that comprises the substance may be stored.

In the example shown in FIG. 6, VOL1 and VOL3 form a copy pair, and the storage system 120, the host computer 110, or the like performs the operation of copying data from VOL1 to VOL3.

Figure 7:
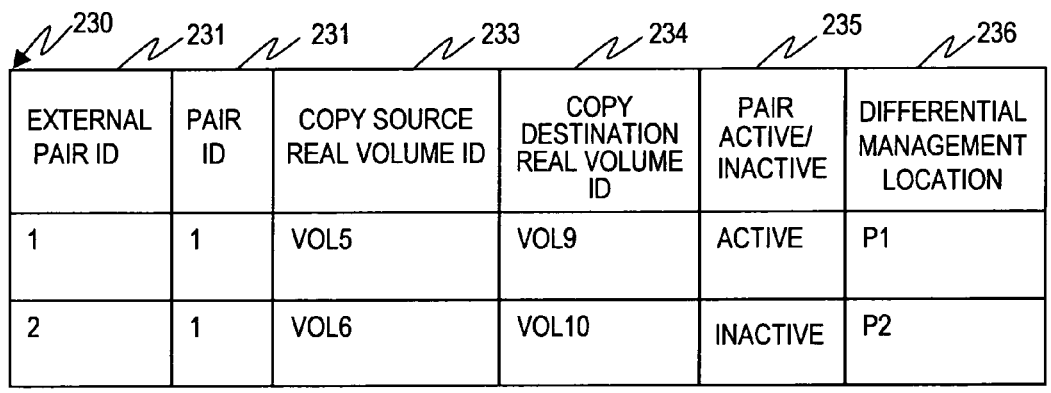
FIG. 7 is a configuration diagram of an external pair volume table according to the first embodiment of this invention.

FIG. 7 is a configuration diagram of the external pair volume table 230 according to the first embodiment of this invention.

The external pair volume table 230 shows the relation, after the real volume copy instructing program 105 complete copy processing, between the real volume 134 that serves as a copy source and the real volume 134 that serves as a copy destination. The external pair volume table 230 holds the volume ID of the copy source real volume 134 and the volume ID of the copy destination real volume 134 between which the copy processing has been executed.

The external pair volume table 230 includes an external pair ID 231, a pair ID 232, a copy source real volume ID 233, a copy destination real volume ID 234, pair activation information 235, and a differential management location 236.

The external pair ID 231 indicates an identifier unique to each copy pair composed of one real volume 134 and another real volume 134. A copy pair here is a pair composed of the copy source real volume 134 and the copy destination real volume 134 between which copy processing is executed. The pair ID 232 indicates an identifier for actually putting into use a copy pair that is identified by the external pair ID 231. An identifier stored as the pair ID 232 is identical to the one stored as the pair ID 221 in the pair volume table 220.

The copy source real volume ID 233 indicates the volume ID of the real volume 134 that serves as a copy source. The copy destination real volume ID 234 indicates the volume ID of the real volume 134 that serves as a copy destination.

The pair activation information 235 indicates whether or not the real volume 134 that serves as a copy source and the real volume 134 that serves as a copy destination are actually in use as a pair. "Active" recorded as the pair activation information 235 indicates that the real volume 134 that serves as a copy source and the real volume 134 that serves as a copy destination are in use as a pair. To be specific, when "allocated" is recorded as the volume allocating information 213 for the copy source real volume ID 233 and the copy destination real volume ID 234, data recorded in the copy source real volume is copied to the copy destination real volume.

"Inactive" recorded as the pair activation information 235 indicates that the real volume 134 that serves as a copy source and the real volume 134 that serves as a copy destination are not in use as a pair at present. To be specific, when "not allocated" is recorded as the volume allocating information 213 for the copy source real volume ID 233 and the copy destination real volume ID 234, data written in the copy source real volume is not copied to the copy destination real volume.

The differential management location 236 indicates a pointer to an area storing differential information, which is the difference between data of the real volume 134 that serves as a copy source and data of the real volume 134 that serves as a copy destination.

Differential information is managed by one or both of the copy source storage system 120 and the copy destination storage system 120.

In the case where either the copy source storage system 120 or the copy destination storage system 120 manages differential information, a pointer to an area of the storage system 120 that manages the differential information is registered as the differential management location 236.

In the case where the copy source storage system 120 and the copy destination storage system 120 both manage differential information, pointers to an area of the copy source storage system 120 and an area of the copy destination storage system 120 where the differential information is stored are registered as the differential management location 236.

Figure 8:
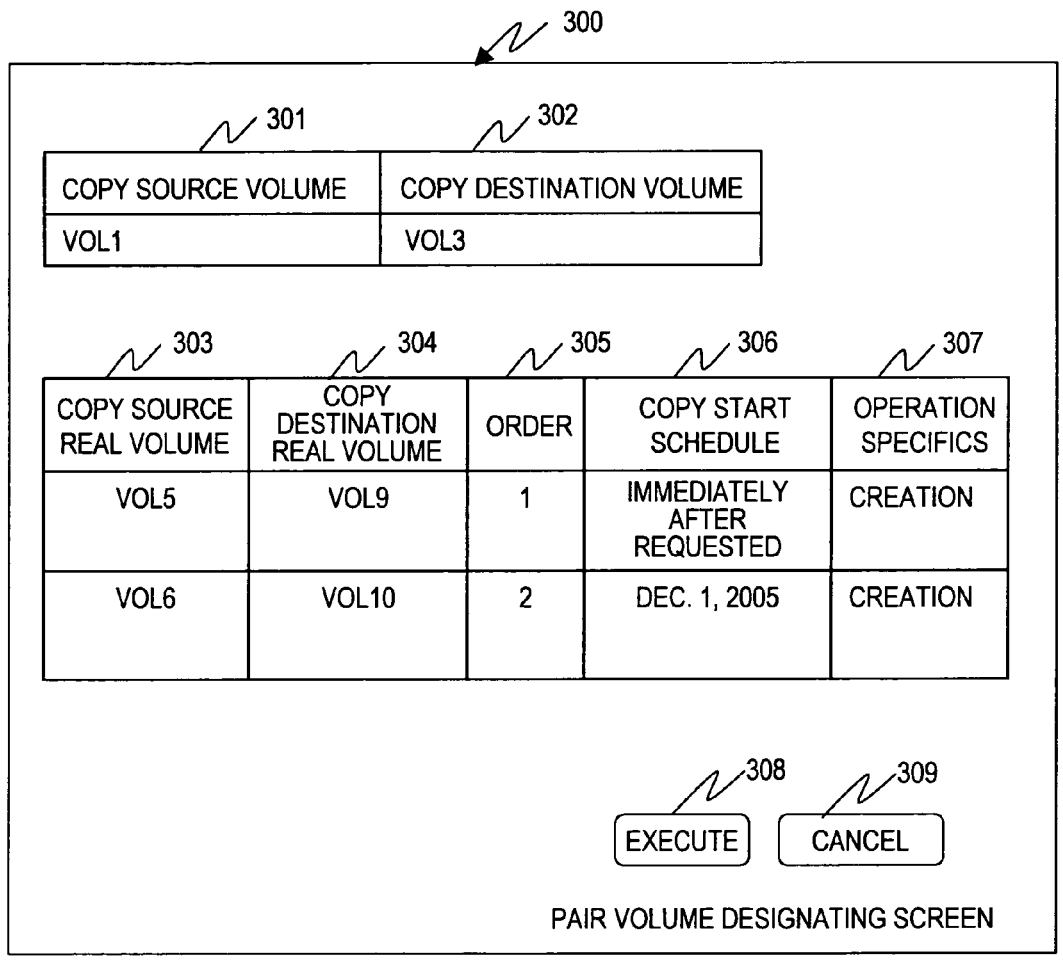
FIG. 8 is a diagram showing a pair volume designating screen according to the first embodiment of this invention.

FIG. 8 is a diagram showing a pair volume designating screen 300 according to the first embodiment of this invention.

The pair volume designating screen 300 comprises a copy source volume 301, a copy destination volume 302, a copy source real volume 303, a copy destination real volume 304, an order 305, a copy start schedule 306, operation specifics 307, an "execute" button 308, and a "cancel" button 309.

A user designates a copy source volume in a field of the copy source volume 301. The user designates a copy destination volume in a field of the copy destination volume 302.

A user designates the real volume 134 as a copy source in a field of the copy source real volume 303. The user designates the real volume 134 as a copy destination in a field of the copy destination real volume 304.

In the case where there are plural copy pairs each having one real volume 134 as a copy source and another real volume 134 as a copy destination, in what order the copy pairs should receive pair operation is specified in a field of the order 305. Specifying the order of copy processing is necessary since only one real volume can be allocated to one virtual volume 124 at a time.

When to start copy processing is specified in a field of the copy start schedule 306. This field is utilized in the case where a time to execute copy processing is entered instead of specifying an order of copy processing in the field of the order 305.

When the order 305 and the copy start schedule 306 conflict with each other, an error message is displayed, or copy processing is executed choosing one of the order 305 and the copy start schedule 306 over the other. For instance, when there are two copy pairs and the first pair receives copy processing first according to the order 305, while the copy start schedule 306 sets an earlier copy processing start time to the second pair than the first pair, the conflict between the two is solved by displaying an error message or by executing copy processing choosing one of the order 305 and the copy start schedule 306 over the other.

In the case where a user specifies the order 305 but not the copy start schedule 306, copy processing may be executed first for a pair that has the youngest number as the order 305 and then for a pair that has the second youngest number as the order 305 immediately.

In the case where a user specifies neither the order 305 nor the copy start schedule 306, copy processing may be executed in an order in which pairs are displayed on the pair volume designating screen 300, starting from the top and proceeding toward the bottom.

The operation specifics 307 are for specifying what kind of pair operation is to be performed. The operation specifics 307 include "creation", "split", "resynchronization", "reverse resynchronization", and "deletion". "Creation" is copy processing for creating a pair. "Split" is processing for splitting a pair and dissolving the pair relation. "Resynchronization" is processing for synchronizing data in a copy source volume of a split pair with data in a copy destination volume of the pair again. "Reverse resynchronization" is processing for synchronizing data in a copy destination volume of a split pair with data in a copy source volume of the pair again. "Deletion" is processing for deleting paired volumes.

The "execute" button 308 is used in executing a pair volume creating operation. The "cancel" button 309 is used in canceling a pair volume creation operation.

In the case where a copy pair is created for every real volume 134 that is associated with the virtual volume 124, it is not necessary for a user to specify the copy source real volume 303 and the copy destination real volume 304. On the other hand, when it is necessary to specify which real volume 134 is to form a copy pair, a user designates volumes as the copy source real volume 303 and the copy destination real volume 304.

There is no need to specify the copy source volume 301 and the copy destination volume 302 when the copy source real volume 303 and the copy destination real volume 304 are specified. As a user designates a pair of real volumes 134, the pair management program 115 picks up from the real volume table 210 the virtual volumes 124 that are associated with the designated real volumes 134, thereby automatically selecting volumes for the copy source volume 301 and the copy destination volume 302.

When the copy destination volume 302 and the copy destination real volume 304 are not specified by a user, the real volume copy instructing program 105 refers to the volume table 200 and the real volume table 210 to automatically select volumes for the copy destination volume 302 and the copy destination real volume 304. In this case, data of the real volume 134 that serves as a copy source may all be copied to the real volume 134 that serves as a copy destination.

In order to specify to which storage or external storage data should be copied, a storage ID or an external storage ID shown in the volume table 200 is entered as the copy destination virtual volume 302 or the copy destination real volume 304.

The pair volume designating screen 300 may have a pair ID designating field, so that which pair should actually receive pair split, resynchronization, or deletion is specified by entering the pair ID 221 of the pair volume table 220 or the external pair ID 231 of the external pair volume table 230.

Figure 9:
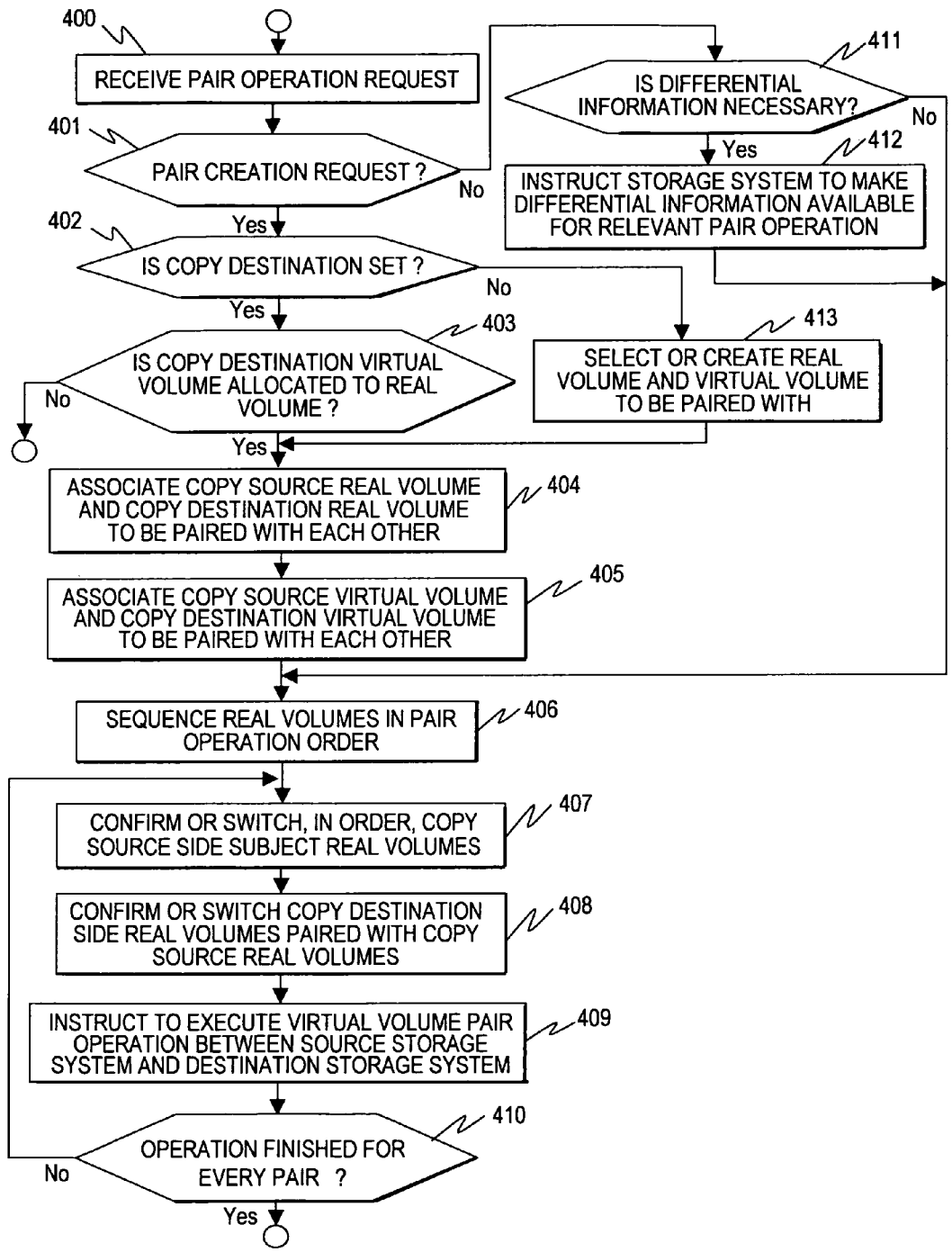
FIG. 9 is a flow chart for real volume pair operation according to the first embodiment of this invention.

FIG. 9 is a flow chart for pair operation processing performed on a pair of real volumes 134 according to the first embodiment of this invention.

Step 400 to Step 406 and Step 409 to Step 413 of the pair operation processing are executed by the real volume copy instructing program 105. Step 407 and Step 408 are executed by the real volume switching instructing program 104.

The management computer 100 receives a pair operation request from a user (Step 400). The received pair operation request includes information on the copy source volume 301, the copy destination volume 302, the copy source real volume 303, the copy destination real volume 304, the order 305, the copy start schedule 306, and the operation specifics 307 that are specified by the user. The user can use a GUI (Graphical User Interface) like the pair volume designating screen 300 shown in FIG. 8 or a CLI (Command Line Interface) in making a copy operation request.

When a pair operation request does not specify the copy source volume 301, or when the designated real volume 134 cannot be allocated to the designated virtual volume 124, the real volume copy instructing program 105 may reject this pair operation request as error. In the case where a condition has to be met to replicate a storage (for example, a condition requiring the real volume 134 that serves as a copy source and the real volume 134 that serves as a copy destination to have the same capacity), the real volume copy instructing program 105 asks the storage system 120 about the state of the designated real volume 134. When the copy condition is not fulfilled, the real volume copy instructing program 105 may reject the pair operation request as error.

When a pair operation request specifies the copy source volume 301 but not the copy source real volume 303, the real volume copy instructing program 105 may designate, as the copy source real volume 134, one of the real volumes 134 that are associated with the virtual volume 124 designated in the request.

A new real volume 134 may be associated with the virtual volume 124 that is designated as a copy source volume by dissolving the association between another virtual volume 124 and its real volumes 134 once. This means that, when a pair operation request specifies the copy source volume 301 but not the copy source real volume 303, the designated virtual volume 124 can be associated newly with other real volumes 134 that have not been associated with this virtual volume 124.

The real volume copy instructing program 105 next judges whether or not "creation" is designated as the operation specifics 307 (Step 401). When "creation" is designated as the operation specifics 307, the processing proceeds to Step 402. When "creation" is not designated as the operation specifics 307 (when "split", "resynchronization", "reverse resynchronization", or "deletion" is designated as the operation specifics 307), the processing proceeds to Step 411.

Next, the real volume copy instructing program 105 judges whether or not the request includes the virtual volume 124 or the real volume 134 that is designated as a copy destination (Step 402). To be specific, the real volume copy instructing program 105 judges whether or not the request specifies the copy destination virtual volume 302 or the copy destination real volume 304.

When the request includes the virtual volume 124 or the real volume 134 that is designated as a copy destination, the processing proceeds to Step 403. When the request does not include the virtual volume 124 or the real volume 134 that is designated as a copy destination, the processing proceeds to Step 413 in order to determine an actual copy destination.

In Step 413, the real volume copy instructing program 105 selects a copy destination virtual volume to be paired with the designated copy source volume and a real volume associated with this copy destination virtual volume. The real volume copy instructing program 105 selects a virtual volume and a real volume that have the same configurations as the copy source virtual volume and the copy source real volume do.

When the copy destination cannot be chosen from existing virtual volumes, the real volume copy instructing program 105 may newly create a copy destination virtual volume to be paired with the designated copy source virtual volume, and a real volume associated with this copy destination virtual volume.

In other words, when no virtual volume 124 associated with plural real volumes 134 can be chosen as the copy destination, a new virtual volume 124 is created and set as the copy destination.

It is also possible to add a new real volume 134 to be associated with an existing virtual volume 124. For instance, when every real volume 134 that is associated with an existing virtual volume 124 is already in use, or when the count of real volumes 134 serving as copy sources does not match the count of real volumes 134 serving as copy destinations, a new real volume 134 is created in the copy destination storage system 120 and is associated with the existing virtual volume 124. In this way, the virtual volume 124 that serves as a copy source can be provided with the virtual volume 124 that is paired with the copy source virtual volume to serve as a copy destination.

In the case where information on the storage system 120 and the external storage system 130 is entered as copy destination volumes in FIG. 8, the volume creation of Step 413 takes place in the designated storage system 120. Finishing the processing of Step 413, the real volume copy instructing program 105 proceeds to Step 404. It is also possible to select an existing virtual volume 124 as the copy destination in Step 413.

The real volume copy instructing program 105 next judges whether or not the virtual volume 124 designated as a copy destination is allocated to the real volume 134 (Step 403). When there is the real volume 134 that is allocated to the virtual volume 124 designated as a copy source, this real volume 134 can form a copy pair with another real volume 134 by selecting, as the copy destination, the virtual volume 124 to which the other real volume 134 is allocated. Whether the count of real volumes 134 serving as copy sources matches the count of real volumes 134 serving as copy destinations or not may be checked in Step 403.

In the case where the real volume 134 is allocated to the copy source virtual volume and the virtual volume 124 that is designated as the copy destination has no real volume 134 allocated thereto, there is no real volume for the real volume 134 that is allocated to the copy source virtual volume 124 to form a copy pair with. The processing is therefore ended. On the other hand, in the case where the real volume 134 is allocated to the copy source virtual volume and the virtual volume 124 that is designated as the copy destination also has one real volume 134 allocated thereto, the processing proceeds to Step 404.

The real volume copy instructing program 105 associates the real volume 134 that serves as a copy source and the real volume. 134 that serves as a copy destination with each other as a copy pair (Step 404). In other words, the real volume copy instructing program 105 chooses a volume that serves as a copy destination for the real volume 134 that serves as a copy source.

To be specific, in the case where the pair operation request received in Step 400 specifies the copy source real volume 303 and the copy destination real volume 304, the real volume copy instructing program 105 checks in Step 404 whether or not this replication relation is valid. In the case where the pair operation request specifies the copy source virtual volume 301 and the copy destination virtual volume 302 instead of the copy source real volume 303 and the copy destination real volume 304, the real volume copy instructing program 105 selects the real volume 134 that serves as a copy source and the real volume 134 that serves as a copy destination.

For instance, when "VOL1" is designated as the copy source volume 301 and "VOL3" is designated as the copy destination volume 302 on the pair volume designating screen 300 shown in FIG. 8, while the copy source real volume 303 and the copy destination real volume 304 are not specified, the real volume copy instructing program 105 refers to the real volume table 210 and selects, as the copy source real volumes 134, "VOL5" and "VOL6" that are associated with "VOL1", which is designated as the copy source volume 301. The real volume copy instructing program 105 also selects, as the copy destination real volumes 134, "VOL9" and "VOL10" that are associated with "VOL3", which is designated as the copy destination volume 302. After that, the real volume copy instructing program 105 selects copy pairs sequentially, for example, in an ascending order of the copy source volumes and in an ascending order of the copy destination volumes. In this example, the copy pair composed of "VOL5" and "VOL9" is selected first and then the copy pair composed of "VOL6" and "VOL10" is selected.

The real volume copy instructing program 105 next associates the virtual volume 124 that serves as a copy source and the virtual volume 124 that serves as a copy destination with each other as a copy pair (Step 405). In other words, the real volume copy instructing program 105 chooses which virtual volume 124 is to be operated by the host computer 110 as a substitute for the copy destination real volume 134 in association with the virtual volume 124 that is operated by the host computer 110 as a substitute for the copy source real volume 134.

Through Step 404 and Step 405, the real volume copy instructing program 105 formulates actual pair operation instruction items.

The real volume copy instructing program 105 determines in what order copy processing is to be performed on the copy source real volumes 134 and the copy destination real volumes 134 that are associated with each other in Step 404 (Step 406).

In the case where a user has specified the order 305 or the copy start schedule 306 on the pair volume designating screen 300 shown in FIG. 8, the real volume copy instructing program 105 follows that order 305 or copy start schedule 306. On the other hand, in the case where neither the order 305 nor the copy start schedule 306 is specified by a user, it is preferable to execute pair operation in a preset order, for example, an order that places the real volume 134 that serves as a copy source and is allocated to the virtual volume 124 first, or an ascending order of the copy source volume ID 201.

Take as an example a case in which neither the order 305 nor the copy start schedule 306 is specified, and the real volumes 134 that serve as destination sources are "VOL5" and "VOL6". The copy source real volumes 134 identified by "VOL5" and "VOL6" are associated with the virtual volume 124 that is identified by "VOL2" according to the real volume table 210. "Allocated" is recorded as the volume allocating information 213 for "VOL5", while "not allocated" is recorded as the volume allocating information 213 for "VOL6".

Since "VOL5" is allocated to "VOL1" and "VOL6" is not allocated to "VOL1", copy processing for "VOL5" is executed first and, after the execution of the copy processing for "VOL5", copy processing for "VOL6" is started. The copy processing schedule may be determined automatically through cooperation between the application program 114 of the host computer 110 and the real volume copy instructing program 105 of the management computer 100.

The real volume switching instructing program 104 switches from one allocation relation between the copy source real volume 134 and the copy source virtual volume 124 to another in accordance with the order determined in Step 406 (Step 407).

To be specific, the real volume switching instructing program 104 judges, from information entered as the order 305 or the copy start schedule 306 on the pair volume designating screen 300, whether or not the copy source virtual volume 124 of a copy pair on which pair operation is being performed is allocated to the real volume 134. When the real volume is not allocated, the real volume switching instructing program 104 gives an instruction to allocate the virtual volume 124 to an appropriate copy source real volume 134. Since only one real volume 134 can be allocated to one virtual volume 124 at a time, a switch is made to allocate the virtual volume 124 to the copy source real volume 134.

For example, in creating a pair with the real volume (VOL5) as a copy source, reference to the real volume table 210 of FIG. 5 reveals that VOL5 is allocated to the virtual volume (VOL1). Confirming that the real volume (VOL5) is actually allocated to the virtual volume (VOL1), the real volume switching instructing program 104 proceeds to Step 408.

In the example shown in FIG. 8, the user has also instructed through the pair volume designating screen 300 to perform pair operation on a pair that has the real volume (VOL6) as a copy source and the real volume (VOL10) as a copy destination. Accordingly, the real volume switching instructing program 104 returns to Step 407 after the processing of Step 410 is finished.

The real volume switching instructing program 104 in this case switches the real volume 134 that is allocated to the virtual volume (VOL1) from VOL5 to VOL6. This is done by invalidating the allocation relation between the virtual volume (VOL1) and the real volume (VOL5) and then allocating the real volume (VOL6) to the virtual volume (VOL1).

When the real volume switching instructing program 104 makes a switch from one allocation relation between the virtual volume 124 and the real volume 134 to another in Step 407, information on every copy pair composed of two real volumes 134 that are paired with each other in Step 405 and Step 406 may be sent to the storage system 120 or the host computer 110 in order to execute the allocation switching between the real volumes 134.

The real volume switching instructing program 104 switches the allocation relation between the real volume 134 and the virtual volume 124 that serve as copy destinations for the copy source real volume and copy source virtual volume processed in Step 407 (Step 408). In other words, the real volume switching instructing program 104 makes a switch from one copy destination real volume 134 to another in accordance with the order or schedule of switching between the real volumes 134 that are associated with the copy source virtual volume 124 in Step 407, or in accordance with a switch made from one copy source real volume 134 to another.

The real volume switching instructing program 104 judges whether or not the copy destination virtual volume 124 associated with the copy destination real volume 134 is allocated to the real volume 134. When it is not, the real volume switching instructing program 104 gives an instruction to allocate the virtual volume 124 to an appropriate copy destination real volume 134.

For example, in performing pair operation on a pair that has the real volume (VOL5) as a copy source and the real volume (VOL9) as a copy destination, reference to the real volume table 210 of FIG. 5 reveals that the copy destination real volume (VOL9) is allocated to the copy destination virtual volume (VOL3). Since the real volume (VOL9) is actually allocated to the virtual volume (VOL3) in this example, the processing proceeds to Step 409.

In the example shown in FIG. 8, the user has also instructed through the pair volume designating screen 300 to perform pair operation on a pair that has the real volume (VOL6) as a copy source and the real volume (VOL10) as a copy destination. Accordingly, the real volume switching instructing program 104 returns to Step 407 after the processing of Step 410 is finished.

Having switched the real volume 134 that is allocated to the virtual volume (VOL1) from VOL5 to VOL6 in Step 407, the real volume switching instructing program 104 in Step 408 switches the real volume 134 that is allocated to the virtual volume (VOL3) from VOL9 to VOL10 in accordance with the switching that has been made in Step 407.

Along with an instruction sent in Step 407 to the host computer 110 or the storage system 120 to make a switch from one copy source real volume 134 to another, the real volume switching instructing program 104 may send to the host computer 110 or the storage system 120 a request to make a switch from one copy destination real volume 134 to another in Step 408.

In the case where the real volume switching instructing program 104 sends this request to the storage system 120, the real volume switching instructing program 126 of the storage system 120 may communicate with and instruct the storage system 120 that has the copy destination virtual volume 124 to make a switch from one copy destination real volume 134 to another.

The storage system 120 receives the same information about copy destination volumes to be switched as the one used by the management computer 100.

For example, when the real volumes VOL5 and VOL12 are designated as a copy pair to receive copy processing with VOL5 as a copy source and VOL12 as a copy destination, the copy destination real volume (VOL12) is not allocated to the virtual volume (VOL4) and, accordingly, the real volume switching instructing program 104 instructs the real volume switching instructing program 126 of the storage system 120 that has the copy destination real volume (VOL12) to allocate the real volume (VOL12) to the virtual volume (VOL4). The real volume that has been allocated to the virtual volume (VOL4) up to this point is the real volume (VOL11), and now a switch is made from the real volume (VOL11) to the real volume (VOL12).

The real volume switching instructing program 116 similarly gives an instruction to switch between connection destination real volumes via the copy destination side host or the copy source side storage.

Step 408 is executed by the real volume switching instructing program 104 of the management computer 100 in this embodiment. Alternatively, the storage system 120 or the host computer 110 may receive an instruction to allocate the copy destination real volume 134 that is paired with the copy source real volume 134 to the copy destination virtual volume 124 at the same time when an instruction to switch the allocation relation between the copy source virtual volume 124 and the copy source real volume 134 is sent to the storage system 120 or the host computer 110 in Step 407.

In the case where the copy source allocation instruction and the copy destination allocation instruction are sent to the storage system 120 that has the copy source virtual volume 124, the connection destination real volume switching instructing program 125 of this storage system 120 may communicate with and instruct the storage system 120 that has the copy destination virtual volume 124 to execute processing of allocating the copy destination real volume 134 to the copy destination virtual volume 124. The storage system 120 receives the same information about copy destination volumes to be switched as the one used by the management computer 100.

For example, when pair operation is executed with the real volume (VOL8) as a copy source and the real volume (VOL12) as a copy destination, the connection destination real volume switching instructing program 125 of the connection destination storage system 120 (storage ID 2) is instructed to allocate the copy destination real volume (VOL12) to the virtual volume (VOL4) at the same time when the destination source real volume (VOL8) is allocated to the virtual volume (VOL2). The real volume that has been allocated to the virtual volume (VOL4) is the real volume (VOL11) and, since only one real volume 134 can be allocated to the virtual volume (VOL4) at a time, a switch is made from the real volume (VOL11) to the real volume (VOL12).

In the case where the copy source allocation instruction and the copy destination allocation instruction are sent to the host computer 110 of the copy source virtual volume 124, the real volume switching instructing program 116 of this host computer 110 similarly gives an instruction to make a switch from one copy destination real volume 134 to another via the copy destination host computer 110 or the copy source storage system 120.

In Step 407 and Step 408 where a switch is made from one real volume 134 to another to be allocated to the virtual volume 124, the real volume switching instructing program 104 may check whether or not the real volume 134 that is to be newly allocated to the virtual volume 124 is actually in a state that allows the switching before allocating this real volume 134 to the virtual volume 124.

Next, the real volume copy instructing program 105 gives an instruction to execute pair operation between the copy source storage system 120 and the copy destination storage system 120 in accordance with the definition of the virtual volume 124 (Step 409). Pair operation is executed between the copy source storage system 120 and the copy destination storage system 120 based on the volume IDs of the copy source virtual volume 124 and the copy destination virtual volume 124 that are allocated to the copy source real volume 134 and the copy destination real volume 134.

After the pair operation is finished, the real volume copy instructing program 105 stores information in the pair volume table 220 and the pair real volume table 230.

There is no particular need to set a pointer as the differential management location 236 in the pair real volume table 230 while data in the real volume 134 that serves as a copy source and data in the real volume 134 that serves as a copy destination are in sync with each other. However, a pointer may be set as the differential management location 236 in order to reserve an area for managing differential information in the case where the end of one kind of pair operation is followed by another kind of pair operation (e.g., pair split). Then the area set to manage differential information is maintained in the storage system 120 on which the pair operation is performed, and a pointer to this area is stored as the differential management location 236 for each pair.

The storage system 120 may store, in the memory 122, as differential information, the difference between data of the real volume 134 that serves as a copy source and data of the real volume 134 that serves as a copy destination, to thereby register the differential management location 236 in anticipation of an event that interrupts pair operation. This makes it possible to resume pair operation from the interrupted point, and pair operation processing is thus executed with efficiency.

The real volume copy instructing program 105 judges whether or not pair operation has been executed for every designated volume pair (Step 410). In the case where every designated volume pair has received pair operation, the pair operation is ended. In the case where not all of the designated volume pairs have received pair operation, the processing returns to Step 407.

In the example of the pair volume designating screen 300 shown in FIG. 8, the copy pair composed of VOL6 and VOL10 is yet to receive pair operation at the time copy processing is executed for the copy pair composed of VOL5 and VOL9, and therefore the processing returns to Step 407. After Step 409 is executed for the copy pair composed of VOL6 and VOL10, the real volume copy instructing program 105 deems that pair operation has been executed for every pair and ends the pair operation processing.

In the case where the real volume copy instructing program 105 judges in. Step 401 that the pair operation request received by the management computer 100 is not a pair creation request, in other words, that the received pair operation request is for pair split, pair resynchronization, pair reverse resynchronization, or pair deletion, whether differential information is necessary or not is judged by the real volume copy instructing program 105 (Step 411). To be specific, the real volume copy instructing program 105 checks whether there is a difference between data of the real volume 134 that serves as a copy source and the real volume 134 that serves as a copy destination. When there is a difference, it is judged that differential information is necessary and the processing proceeds to Step 412. When there is no difference, it is judged that differential information is not necessary and the processing moves to Step 406.

The real volume copy instructing program 105 instructs the storage system 120 to make differential information available for the requested pair operation (Step 412). The storage system 120 refers to the differential management location 236 of the pair real volume table 230 and changes settings in a manner that makes the differential information of the copy source real volume 134 and the copy destination real volume 134 available to the pair.

Pair operation in this embodiment is executed between two storage systems 120. This invention is also applicable to a case in which three or more storage systems 120 are connected to one another and the external storage system 130 is connected to each storage system 120, and pair operation for three or more volumes can be executed by performing pair operation on one pair at a time.

This embodiment describes a case in which the real volume 134 connected to the virtual volume 124 that serves as a copy source has the same data as the real volume 134 connected to the virtual volume 124 that serves as a copy destination. This invention is also applicable when the real volume 134 connected to the virtual volume 124 that serves as a copy source has different data from the real volume 134 connected to the virtual volume 124 that serves as a copy destination.

The above situation occurs when, for example, the frequency of making a switch from one real volume 134 to another differs between the copy source virtual volume 124 and the copy destination virtual volume 124. A specific example is given in which the virtual volume (VOL2) as a copy source is paired with the virtual volume (VOL13) as a copy destination and data of the real volume (VOL7) associated with the copy source virtual volume (VOL2) is copied to the real volume (VOL14) and the real volume (VOL15) associated with the copy destination virtual volume (VOL13). The copy source virtual volume (VOL2) makes a switch from one of its associated real volumes 134 to another at two-week intervals, so that VOL2 remains allocated to each real volume 134 for two weeks, while the copy destination virtual volume (VOL13) makes a switch from one of its associated real volumes 134 to another at one-week intervals, so that VOL13 remains allocated to each real volume 134 for one week.

The copy start schedule 306 of the pair volume designating screen 300 is set such that every week a switch is made between the copy pair composed of the copy source real volume (VOL7) and the copy destination real volume (VOL14) and the copy pair composed of the copy source real volume (VOL7) and the copy destination real volume (VOL15).

The computer system of the first embodiment follows this setting to execute copy processing for the copy pair composed of VOL7 and VOL14. After one week, the real volume switching instructing program 104 allocates the real volume (VOL15) as a copy destination to the copy destination virtual volume (VOL13) in Step 408, and performs copy processing on the copy pair composed of VOL7 and VOL15, without changing the allocation relation between the copy source real volume (VOL7) and the copy source virtual volume (VOL2) in Step 407.

The storage system 120 that has the copy destination virtual volume (VOL13) copies data of the real volume (VOL14) to the real volume (VOL15) while pair operation is being executed for the copy pair composed of VOL7 and VOL14.

This way, as the copy pair that receives pair operation is switched to the pair composed of VOL7 and VOL15, there is no need to copy every piece of data in the copy source real volume (VOL7) to the copy destination real volume (VOL15). Instead, it only needs to execute pair operation for the difference between data in the copy source real volume (VOL7) and data in the copy destination real volume (VOL15) to which data of the real volume (VOL14) has been copied. In short, after the real volume 134 allocated to the copy destination virtual volume 124 is switched from one to another, differential information is utilized to make data stored in the newly allocated real volume 134 consistent with data stored in the formerly allocated real volume 134. The pair operation is thus made quicker.

The virtual volume 124 that serves as a copy source is, in this embodiment, a volume that does not actually store data (actual data is stored in the real volume 134 that is allocated to the virtual volume 124). However, such a pair creation request is also valid that designates only the real volume 134 as a copy destination when the copy source virtual volume 124 actually stores data.

For instance, in the case where the virtual volume (VOL2) is a volume that has the substance and VOL14 is designated as the copy destination real volume 134, the real volume copy instructing program 105 may allocate VOL14 to the virtual volume (VOL13) and instruct the storage system 120 to execute pair operation between VOL2 and VOL13.

Copy pair operation is executable in this case and the processing of Step 400 to Step 413 is executed except Step 407, where the real volume switching instructing program 104 does not need to make a switch from one copy source real volume 134 to another.

In this case, the real volume copy instructing program 105 may proceed to Step 403 regardless of whether there is the virtual volume 124 designated as a copy destination in Step 402 or not.

In this embodiment, whether or not the copy source virtual volume 124 and the copy destination virtual volume 124 are allocated to the real volumes 134 of the storage system 120 is judged and, based on a result of the judging, data stored in the copy source real volume 134 is copied to the copy destination real volume 134, and then information on the replication relation between the copy source real volume 134 and the copy destination real volume 134 that have received copy processing is stored in the memory 102. This embodiment is thus capable of copying data of each real volume 134 allocated to the virtual volume 124 when the virtual volume 124 is associated with plural real volumes 134.

When it is judged in Step 407 and Step 408 that the copy source real volume 134 or the copy destination real volume 134 is not allocated to the virtual volume 124, the allocation relation is changed in Step 407 so that another copy source real volume 134 associated with the copy source virtual volume 124 is allocated to the copy source virtual volume 124, the allocation relation is changed in Step 408 so that another copy destination real volume 134 associated with the copy destination virtual volume 124 is allocated to the copy destination virtual volume 124 in accordance with the change in the preceding step where another copy source real volume 134 associated with the copy source virtual volume 124 is allocated to the copy source virtual volume 124, and then data stored in the newly allocated copy source real volume 134 is copied to the newly allocated copy destination real volume 134. This embodiment thus makes it possible to automatically copy data of plural real volumes 134 that are associated with the virtual volume 124 and allocated, one at a time, to the virtual volume 124.

With a pair operation request that does not specify which virtual volume 124 is to serve as a copy source, pair operation is still executable as long as the request specifies which real volume 134 serves as a copy source and which real volume 134 serves as a copy destination, since the real volume copy instructing program 105 automatically designates the copy source virtual volume 124 and the real volume 134 that is allocated to this virtual volume 124.

As long as there is either the virtual volume 124 or the real volume 134 that is designated as a copy source, the real volume copy instructing program 105 creates or selects the virtual volume 124 and the real volume 134 that serve as copy destinations, and therefore which virtual volume 124 and which real volume 134 are to serve as copy destinations can be determined automatically.

The connection between the host computers 110 can be omitted when communications between the host computers 110 are not necessary.

A first modification example of the first embodiment will be described with reference to FIG. 10 and FIG. 11. Components common to the first embodiment and the first modification example will be denoted by the same reference symbols to avoid repeating their descriptions.

Figure 10:
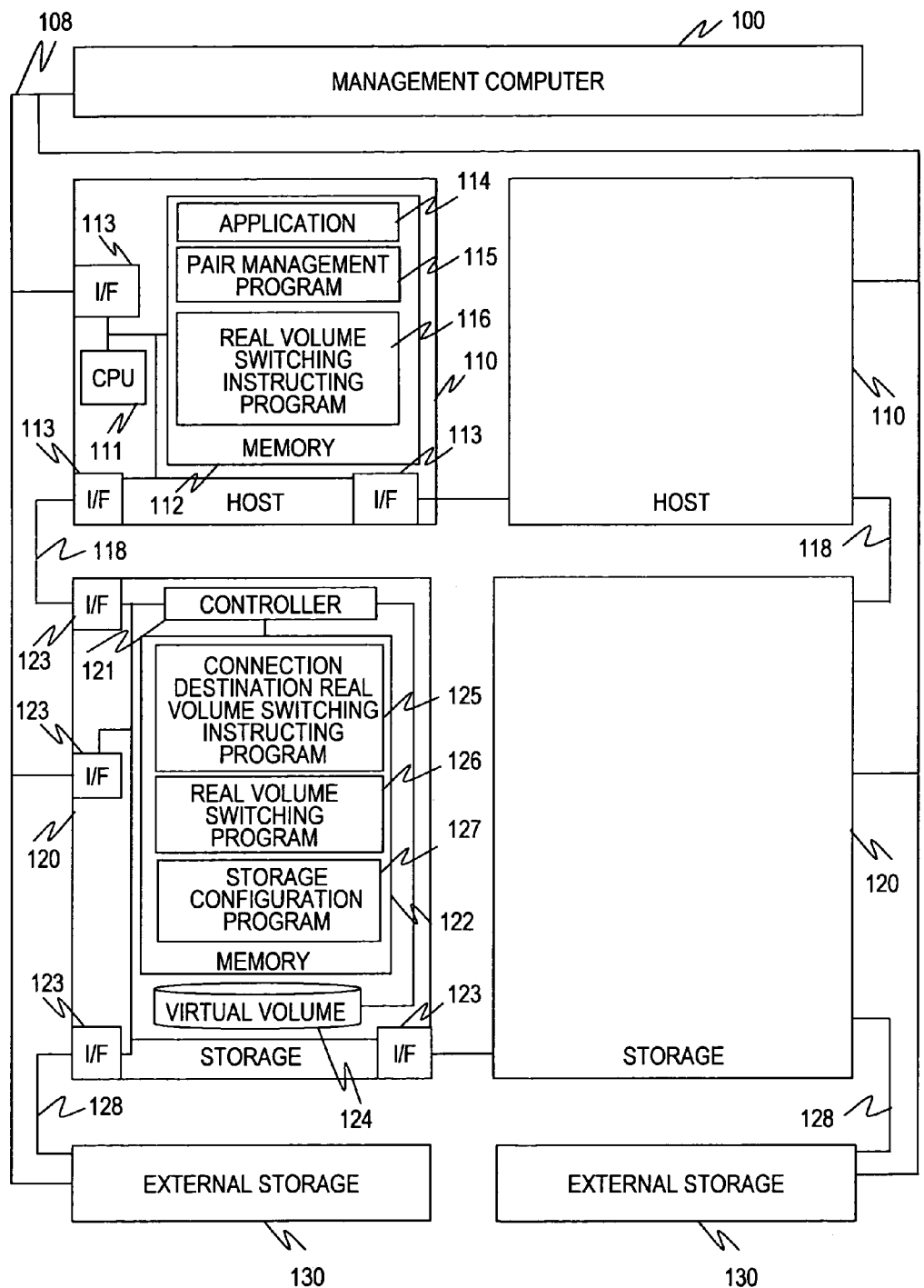
FIG. 10 is a configuration diagram showing a computer system according to a first modification example of the first embodiment of this invention.

FIG. 10 is a configuration diagram showing a computer system according to the first modification example of the first embodiment of this invention.

The computer system shown in FIG. 10 according to the first modification example of the first embodiment is mostly similar to the computer system according to the first embodiment of this invention. The difference between the two is that the external storage system 130 of the first modification example has an interface 133 for communicating directly with another external storage system 130.

The interface 133 handles data I/O related to data transfer to and from another external storage system 130, or the like.

Figure 11:
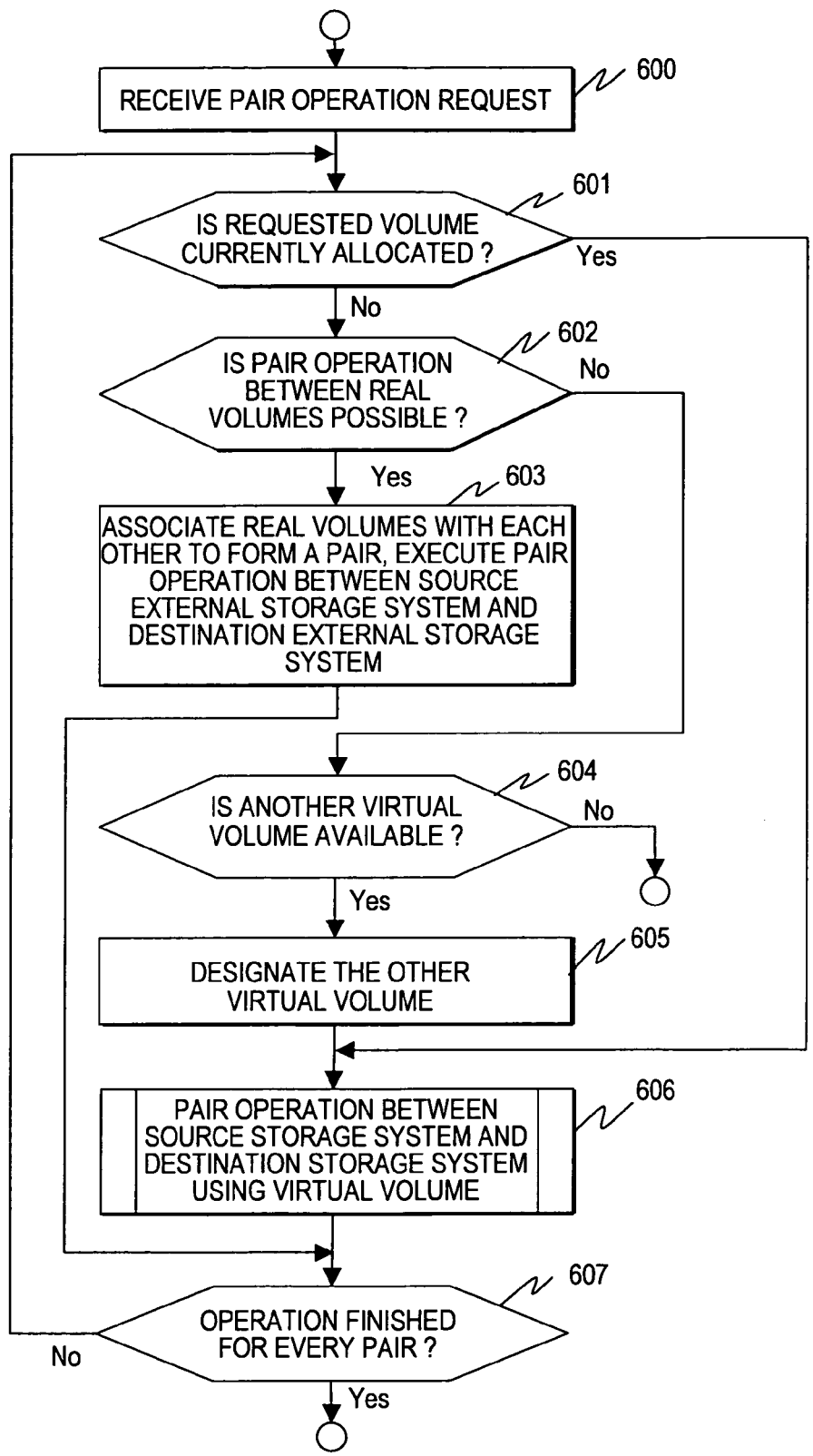
FIG. 11 is a flow chart for real volume pair operation according to the first modification example of the first embodiment of this invention.

FIG. 11 is a flow chart for pair operation performed on a pair of real volumes 134 according to the first modification example of the first embodiment of this invention.

Step 606 shown in FIG. 11 is similar to Step 401 to Step 413 of the pair operation according to the first embodiment. Step 600 to Step 605 and Step 607 are executed by the real volume copy instructing program 105.

In Step 600, the real volume copy instructing program 105 of the management computer 100 receives a pair operation request from a user as in Step 400 of the first embodiment.

The real volume copy instructing program 105 refers to the real volume table 210 to judge whether at least one of the real volume 134 designated as a copy source in the pair operation request and the real volume 134 designated as a copy destination in the request is allocated to the virtual volume 124 or not (Step 601).

When at least one of the copy source real volume 134 and the copy destination real volume 134 is allocated to the virtual volume 124, the processing proceeds to Step 606. When neither the copy source real volume 134 nor the copy destination real volume 134 is allocated to the virtual volume 124, the processing proceeds to Step 602.

In the case where the copy source real volume is VOL7 and the copy destination real volume is VOL11, both volumes are allocated to the virtual volumes 124 and the next step is therefore Step 606.

In the case where the copy source real volume is VOL7, which is allocated to the virtual volume 124, and the copy destination real volume is VOL12, which is not allocated to any virtual volume 124, in this modification example, the processing proceeds to Step 606. However, being the copy destination real volume 134, VOL12, if not in use, may be disconnected once from the virtual volume (VOL4) to make Step 602 the next step.

The real volume copy instructing program 105 judges in Step 602 whether or not pair operation is executable between the copy source real volume 134 and the copy destination real volume 134. To be specific, the real volume copy instructing program 105 judges whether or not the external storage system 130 has a copy function regardless of the copy function of the storage system 120, whether or not the external storage system 130 is connected to and communicable with another external storage system 130 through interface 133, and the like.

When the real volume copy instructing program 105 judges that pair operation is executable between the external storage systems 130, the processing proceeds to Step 603, while the next step is Step 604 when it is judged that pair operation is not executable between the external storage systems 130.

In Step 603, the real volume copy instructing program 105 pairs the copy source real volume 134 with the copy destination real volume 134 to form a copy pair, and gives an instruction to execute pair operation between the copy source external storage system 130 and the copy destination external storage system 130 in order to process the copy source real volume 134 and the copy destination real volume 134.

In the case where differential information is found in the external pair volume table 230, the differential information may be handed over to the external storage system 130 at this point.

The real volume copy instructing program 105 then stores, in the pair volume table 220, the ID of the copy source real volume 134 as the copy source volume ID 222 and the ID of the copy destination real volume 134 as the copy destination volume ID 223. Similarly, the real volume copy instructing program 105 stores, in the external pair volume table 230, the ID of the copy source real volume 134 as the copy source real volume ID 233 and the ID of the copy destination real volume 134 as the copy destination real volume ID 234.

In the case where the differential information is handed over to the external storage system 130, a pointer to a differential management area of the external storage system 130 is stored as the differential management location 236.

The differential information may be handed back to the storage system 120 after pair operation between the source external storage system 130 and the destination external storage system 130 is finished. Alternatively, the differential information may be handed over to the storage system 120 when the pair operation executed between the source external storage system 130 and the destination external storage system 130 is next executed in the storage system 120.

This makes it possible to execute copy processing for the real volume 134 that is not allocated to any virtual volume 124 during copy processing of the real volume 134 that is allocated to the virtual volume 124. Copy processing is thus executed with efficiency and the performance load of the storage system 120 can be decreased.

Judging that pair operation is not executable between the source external storage system 130 and the destination external storage system 130, the real volume copy instructing program 105 checks whether there are other virtual volumes 124 that can be allocated to the copy source real volume 134 and the copy destination real volume 134 (Step 604).

Reference to the real volume table 210 shows that all the real volumes 134 are connected to the virtual volumes 124. Accordingly, the connection of another virtual volume 124 to the real volume 134 is removed once to connect the other virtual volume 124 to the copy source real volume 134 and allocate the other virtual volume 124 to the copy source real volume 134. The same processing is executed for the copy destination real volume 134.

Which virtual volume 124 is to be allocated to the copy source real volume 134 and which virtual volume 124 is to be allocated to the copy destination real volume 134 may be selected by a user.

In the case where there are other virtual volumes 124 that can be allocated, the processing proceeds to Step 605. In the case where there are no other virtual volumes 124 that can be allocated, the pair operation is ended.

In the case where plural pair operation requests are made and there are no virtual volumes 124 that can be allocated, the processing may proceed to Step 607 after informing the user of the fact that pair operation is not executable.

Next, the real volume switching instructing program 104 allocates the copy source real volume 134 to another virtual volume 124 as the copy source virtual volume 124. The real volume switching instructing program 104 allocates the copy destination real volume 134 to another virtual volume 124 as the copy destination virtual volume 124. Then the real volume copy instructing program 105 gives an instruction to execute pair operation between the copy source virtual volume 124 and the copy destination virtual volume 124 (Step 605).

After that, the real volume copy instructing program 105 stores information in the pair volume table 220 and the external pair volume table 230.

The other virtual volume 124 connected to the copy source real volume 134 and the other virtual volume 124 connected to the copy destination real volume 134 may be designated by a user in a pair operation request. In this case, the real volume copy instructing program 105 updates the real volume table 210 to post-pair operation information after the requested pair operation is finished.

In the case where the other virtual volume 124 is not used after the pair operation is finished, the other virtual volume 124 may be disconnected from the copy source or copy destination real volume 134 so that the other virtual volume 124 is connected once again to the real volume 134 that has been connected to this virtual volume 124 prior to the pair operation to go back to the state prior to the pair operation.

For instance, when the real volume (VOL8) is designated as a copy source and the real volume (VOL12) is designated as a copy destination, the virtual volume 134 that is connected to VOL8 is VOL2 and the virtual volume 134 that is connected to VOL12 is VOL4. Neither VOL8 nor VOL12 is allocated to the virtual volume 124.

Then another virtual volume (VOL20) is allocated to VOL8 and another virtual volume (VOL21) is allocated to VOL12 to execute pair operation between VOL20 and VOL21.

In the case where the host computer 110 is to use the other virtual volumes VOL20 and VOL21 after the pair operation is finished, VOL20 and VOL21 are entered as the virtual volume ID 212 in the entries of the real volume table 210 for VOL8 and VOL12, respectively.

In the case where the host computer 110 is not going to use the other virtual volumes VOL20 and VOL21 after the pair operation, the allocation relation between VOL8 and VOL20 and the allocation relation between VOL12 and VOL21 are dissolved. VOL20 and VOL21 may be deleted.

This makes it possible to execute pair operation of the copy source and copy destination real volumes 134 that have not been allocated to the virtual volumes 124 while pair operation is being performed on the copy source and copy destination real volumes 134 that have been allocated to the virtual volumes 124.

In Step 606, the real volume copy instructing program 105 gives an instruction to execute pair operation between the virtual volumes 124 that are designated as a copy source and a copy destination in the pair operation request. To be specific, Step 401 to Step 409 of the first embodiment are executed.

The real volume copy instructing program 105 next judges whether or not the pair operation has been performed on every copy source real volume that is designated in the pair operation request (Step 607). When it is judged that every copy source real volume 134 has received the pair operation, the pair operation processing is ended, while the processing returns to Step 601 when it is judged that not all of the copy source real volumes 134 have received the pair operation.

Processings of Step 602 to step 603 and processings of Step 604 to step 605 may be replaced in the flow chart, so that the processing of Steps 602 and 603 is executed after the processing of Steps 604 and 605.

This pair operation is also applicable to the first embodiment of this invention since, when it is judged in Step 602 that pair operation is not executable between the real volumes 134, only Step 604 to Step 607 are executed.

A user may be given a choice in how the processing of Step 602 and Step 603, the processing of Step 604 and Step 605, and the processing of Step 607 are executed.

To be specific, a user may choose whether to use a normal use virtual volume in Step 602. In Step 604 and Step 605, a user may choose whether to perform operation on the real volumes 134 alone, or to execute pair operation for a different copy pair than volumes that are in use by setting up other virtual volumes 124. This makes it possible to set up a pair environment that suits a user's request.

A user may also designate virtual volumes 124 as other virtual volumes 124 which are to be allocated to the copy source and copy destination real volumes 134.

The pair operation of Step 603, namely, pair operation between the real volumes 134, and the pair operation of Step 606, namely, pair operation between other virtual volumes 124, may be executed using differential information of the pair operation that is executed in Step 409 between the virtual volumes 124. When it is not possible to carry over this differential information to Step 603 and Step 606, the differential information is deleted.

According to this modification example, when it is judged that copy source or copy destination real volume 134 is not allocated to the virtual volume 124, data stored in the copy source real volume 134 is copied to the copy destination real volume 134 through direct communications between the source external storage system 130 and the destination external storage system 130, and then information on the replication relation between the copy source real volume 134 and the copy destination real volume 134 that have received copy processing is stored in the memory 102. The first modification example thus makes it possible to perform pair operation on the real volumes 134 that are not allocated to the virtual volumes 124 while pair operation for the real volumes 134 that are allocated to the virtual volumes 124 is being executed. The pair operation efficiency is accordingly improved and the load of the storage system 120 is lessened.

A second modification example of the first embodiment will be described with reference to FIG. 12. Components common to the first embodiment and the second modification example will be denoted by the same reference symbols to avoid repeating their descriptions.

A computer system embodying the second modification example of the first embodiment of this invention has the management computer 100, the host computer 110, and the storage system 120.

In the second modification example, the configurations of the management computer 100 and the host computer 110 are the same as those in the first embodiment, and the storage system 120 has the real volume 134.

Figure 12:
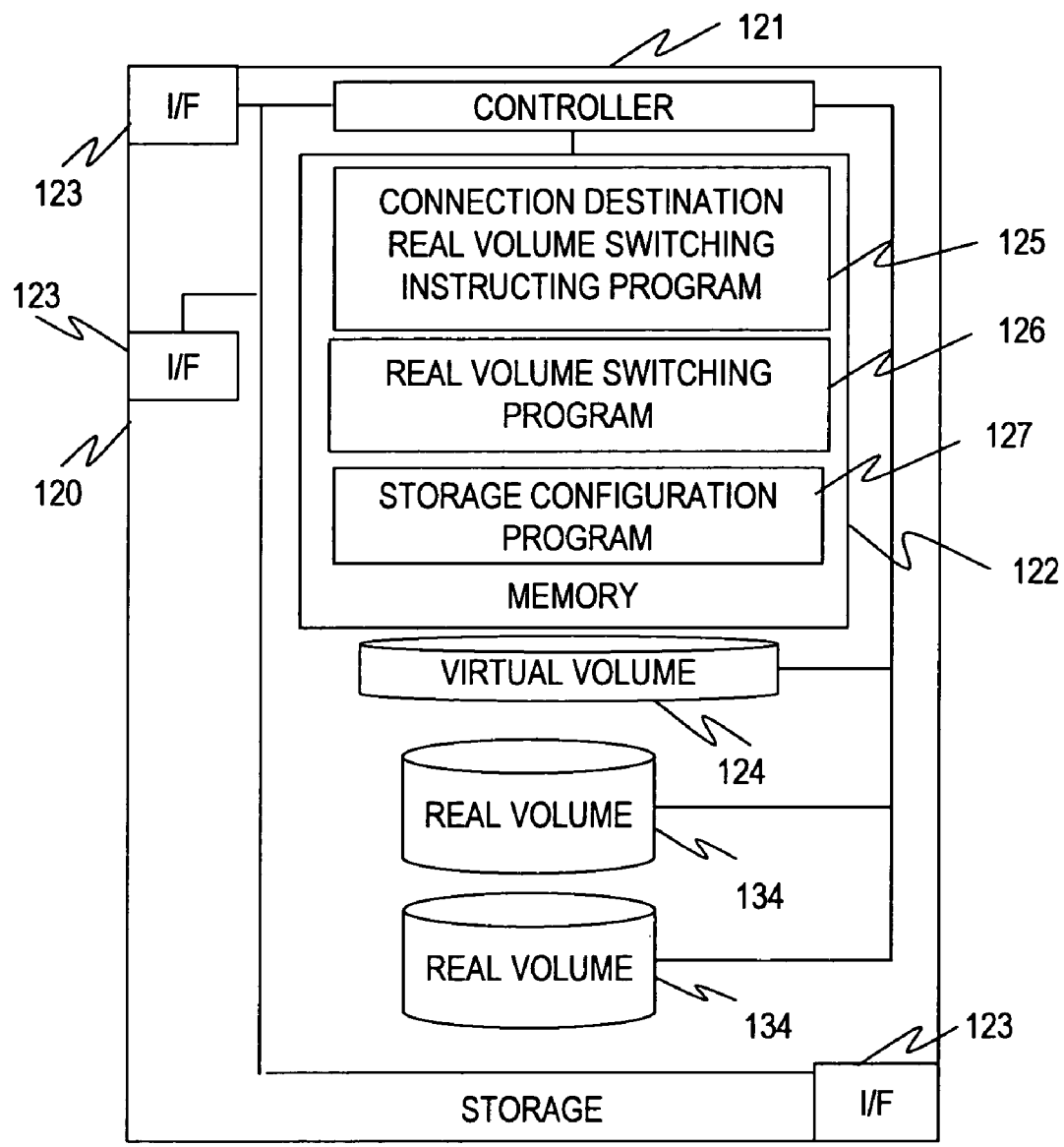
FIG. 12 is a block diagram of a, storage according to a second modification example of the first embodiment of this invention.

FIG. 12 is a block diagram of the storage system 120 according to the second modification example of the first embodiment of this invention.

The storage system 120 has the real volume 134 connected to the controller 121.

Pair operation processing of this modification example is the same as Step 400 to Step 413, except that the processing of switching the allocation of the virtual volume 124 in Step 407 and Step 408 is executed in the storage system 120.

A third modification example of the first embodiment will be described with reference to FIG. 13. Components common to the first embodiment and the third modification example will be denoted by the same reference symbols to avoid repeating their descriptions.

In the third modification example of the first embodiment, a single storage system 120 executes pair operation of the virtual volumes 124. This means that the virtual volume 124 that serves as a copy source and the virtual volume 124 that serves as a copy destination are included within the same storage.

Figure 13:
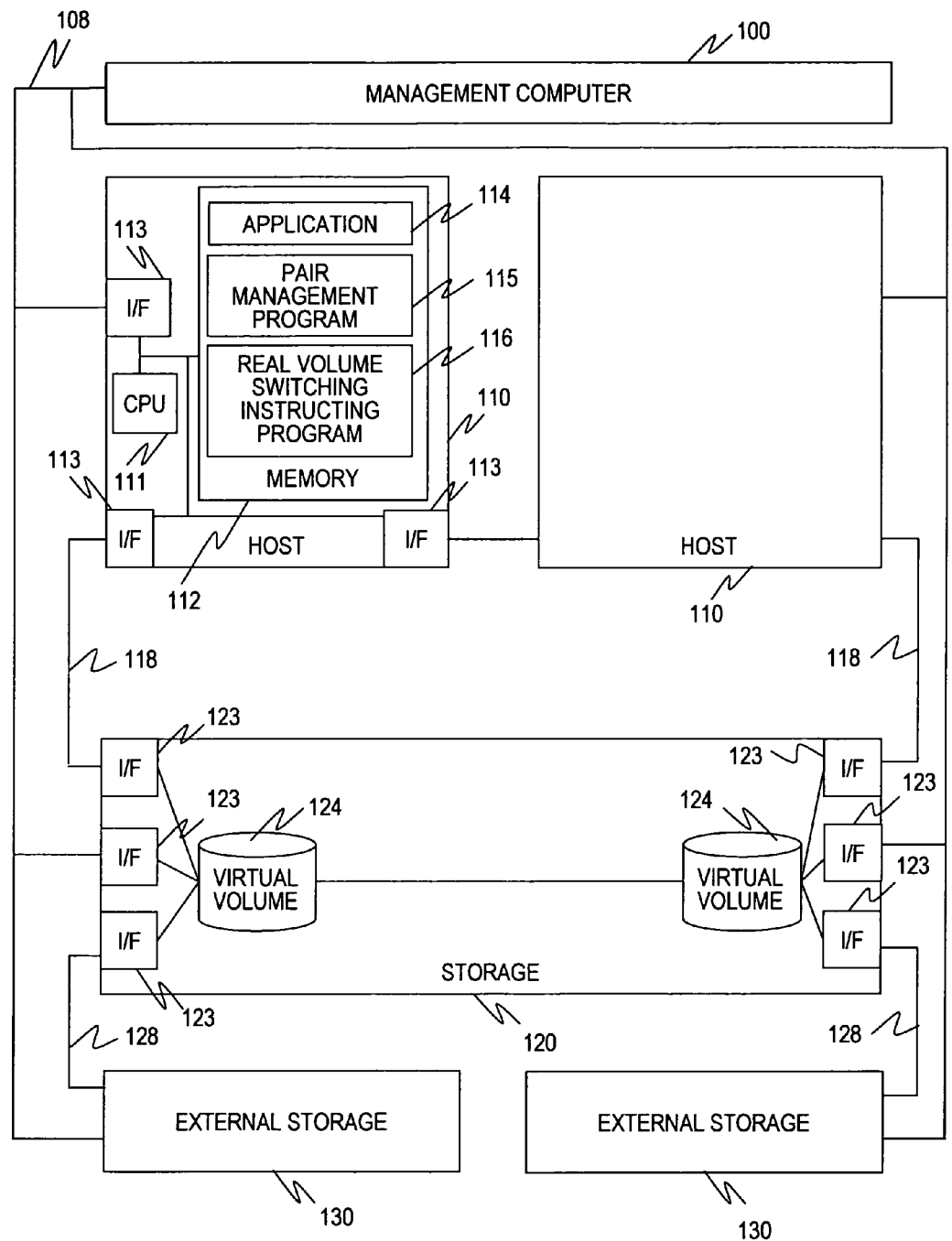
FIG. 13 is a configuration diagram showing a computer system according to a third modification example of the first embodiment of this, invention.

FIG. 13 is a configuration diagram of a computer system embodying the third modification example of the first embodiment of this invention.

The configurations of the management computer 100, the host computer 110 and the external storage system 130 in the third modification example are the same as in the first embodiment.

The third modification example differs from the first embodiment in that the storage system 120 of this modification example has two virtual volumes 124. The count of virtual volumes 124 in one storage system 120 is not limited to two and may be larger than two.

Pair operation processing of this modification example is the same as Step 400 to Step 413, except that in, Step 409, the real volume copy instructing program 105 of the management computer 100 gives an instruction to execute pair operation between the virtual volumes 124 within the storage system 120 since the storage system 120 of this modification example has plural virtual volumes 124.

Second Embodiment

The second embodiment of this invention will be described with reference to FIG. 14 to FIG. 22. Components common to the first embodiment and the second embodiment will be denoted by the same reference symbols to avoid repeating their descriptions.

In the second embodiment, data stored in the real volume 134 that serves as a copy source is copied to the real volume 134 that serves as a copy destination via a real volume 154.

Figure 14:
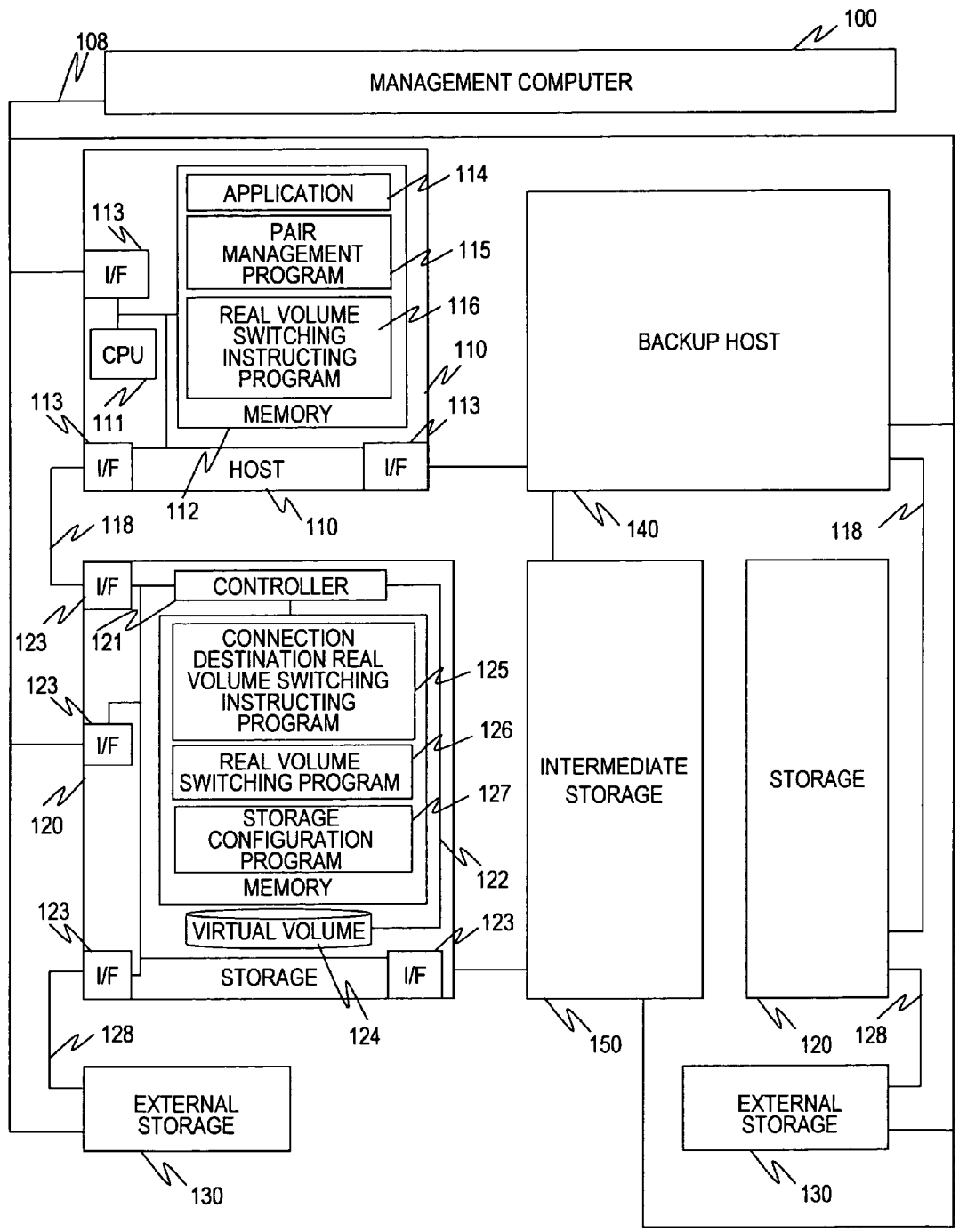
FIG. 14 is a configuration diagram showing a computer system according to a second embodiment of this invention.

FIG. 14 is a configuration diagram showing a computer system according to the second embodiment of this invention.

The computer system of this embodiment the management computer 100, the host computer 110, the storage system 120, and the external storage system 130, a backup host computer 140, and an intermediate storage 150.

The management computer 100, the host computer 110, the storage system 120 and the external storage system 130 in the second embodiment are the same as those in the first embodiment.

The backup host computer 140 is connected by the first connection 108 to the management computer 100, the host computer 110, the storage system 120, the external storage system 130 and the intermediate storage 150. The backup host computer 140 is connected to the storage system 120 by the second connection 118, and to the host computer 110 as well as the intermediate storage 150.

The intermediate storage 150 is connected by the first connection 108 to the management computer 100, the host computer 110, the storage system 120, the external storage system 130 and the backup host computer 140. The intermediate storage 150 is connected to the storage system 120 and the backup host computer 140.

In this embodiment, the virtual volume 124 of the storage system 120 is paired with the real volume 154 of the intermediate storage 150, and data stored in the real volume 154 can be copied to the virtual volume 124 of another storage system 120 via the backup host computer 140.

The real volume 154 may be placed in the copy source storage system 120 or the copy destination storage system 120 instead of the intermediate storage 150. In this case, copy operation is executed in the storage system 120 that has the real volume 154, while the rest of the processing is the same as the pair operation processing of the second embodiment.

In the case where no real volume 154 is provided, copy processing may be executed via the backup host computer 140 without pairing the virtual volume 124 of the storage system 120 with another virtual volume 124.

Figure 15:
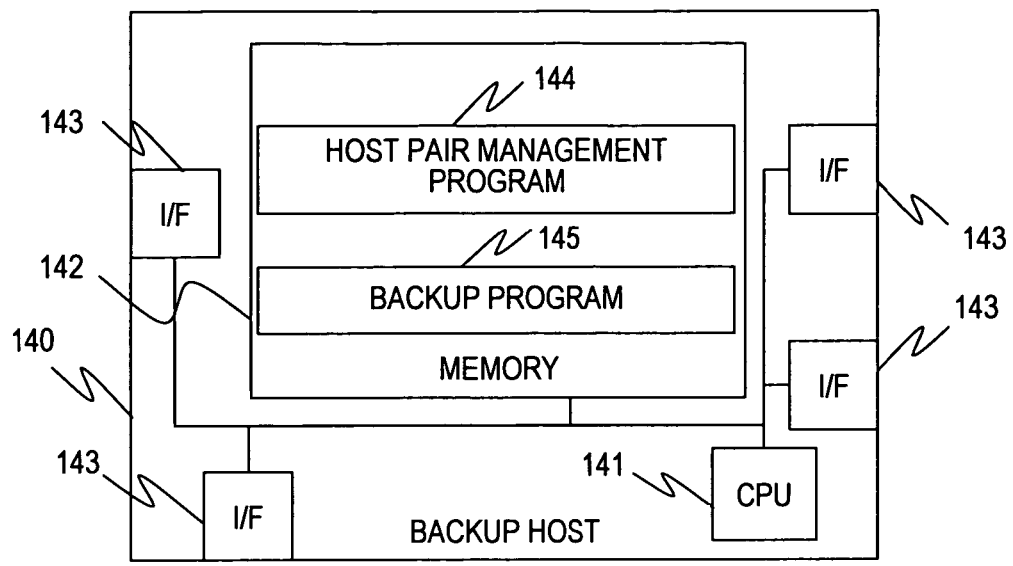
FIG. 15 is a block diagram of a backup host computer according to the second embodiment of this invention.

FIG. 15 is a block diagram of the backup host computer 140 according to the second embodiment of this invention. The backup host computer 140 has a configuration similar to that of the host computer 110, but differs from the host computer 110 in that a memory 142 stores a backup program 145.

The backup host computer 140 has a CPU 141, the memory 142 and an interface 143. The CPU 141, memory 142 and interface 143 of the backup host computer 140 are similar to the CPU 111, memory 112 and interface 113 of the host computer 110.

The memory 142 stores a host pair management program 144 and the backup program 145. The host pair management program 144 is a, collective name for programs that are similar to the application program 114, pair management program 115, and real volume switching instructing program 116 of the host computer 110. The backup program 145 is a program that executes data backup and recovery by copying data of the real volume 154 in the intermediate storage 150, via the virtual volume 124 in the storage system 120, to the real volume 134 that is connected to this virtual volume 124. The storage system 120 and the external storage system 130 that the backup program 145 uses may be tape libraries, DVD libraries, or the like. For example, the external storage system 130 may be a tape library that handles the real volume 134 as a tape.

The backup host computer 140 of this embodiment has more than one interface 143. To be specific, the backup host computer 140 of this embodiment has, as the interfaces 143, an interface that is connected to the first connection 108 and uses a TCP/IP protocol for communications with the management computer 100 and others, an interface that is connected to the second connection 118 and uses a Fibre Channel protocol for communications with the storage system 120, an interface for a connection to communicate with host computer 110, and an interface for a connection to communicate with the intermediate storage 150.

Figure 16:
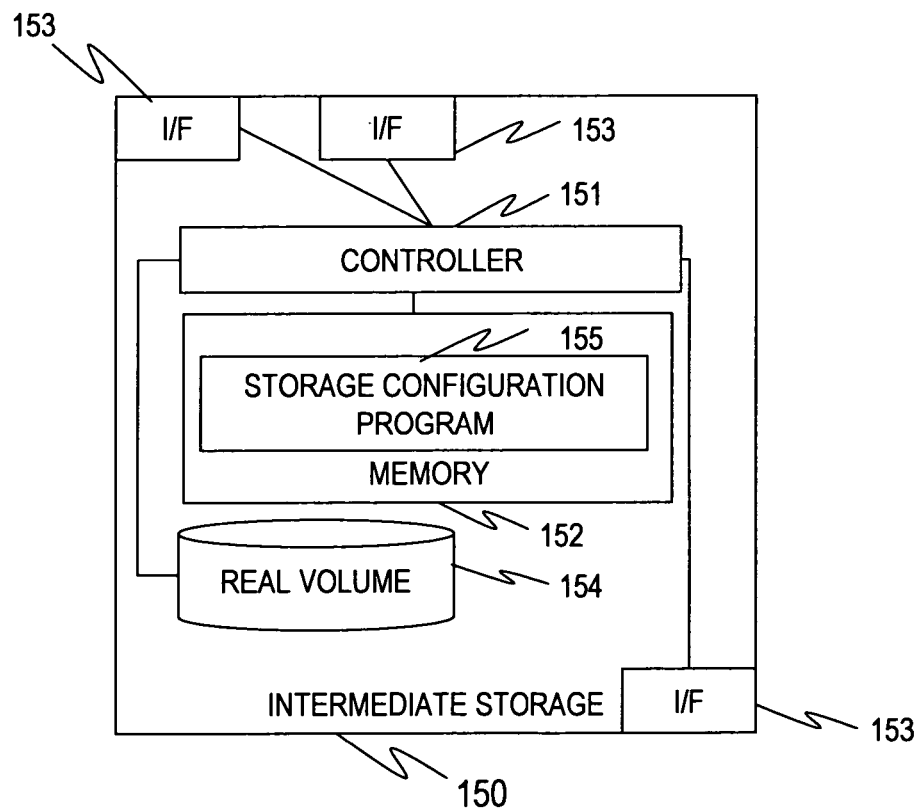
FIG. 16 is a block diagram of an intermediate storage according to the second embodiment of this invention.

FIG. 16 is a block diagram of the intermediate storage 150 according to the second embodiment of this invention.

The intermediate storage 150 may have the same components as those of the storage system 120 or the external storage system 130 as long as the intermediate storage 150 can be paired with the storage system 120.

The intermediate storage 150 is composed of a controller 151, a memory 152, which stores a storage configuration program 155, an interface 153 and the real volume 154. The controller 151, the memory 152, the real volume 154 and the storage configuration program 155 are structured the same way the controller 131, the memory 132, the real volume 134 and the storage configuration program 135, respectively, are structured in the external storage system 130.

The controller 151 is connected to the interface 153, the memory 152, and the real volume 154.

The intermediate storage 150 has more than one interface 153. The intermediate storage 150 according to this embodiment has an interface that is connected to the first connection 108 and uses a TCP/IP protocol for communications with the management computer 100 or the like, an interface that is connected to the second connection 118 and uses a Fibre Channel protocol for communications with the storage system 120, and an interface for connection to communicate with the external storage system 130.

The real volume 154 is provided by, for example, a hard disk drive similarly to the real volume 134. In this case, the intermediate storage 150 is a storage with a hard disk. The real volume 154 may be a logical volume obtained by arranging hard disk drives into a RAID configuration. The intermediate storage 150 in this case is a RAID device.

The real volume 154 may be provided by a removable medium for data backup such as a tape or a DVD, or other such storage means. The intermediate storage 150 in this case is a tape library which automatically switches tapes as removable media, or a DVD library which automatically switches DVDs as removable media.

Figure 17:
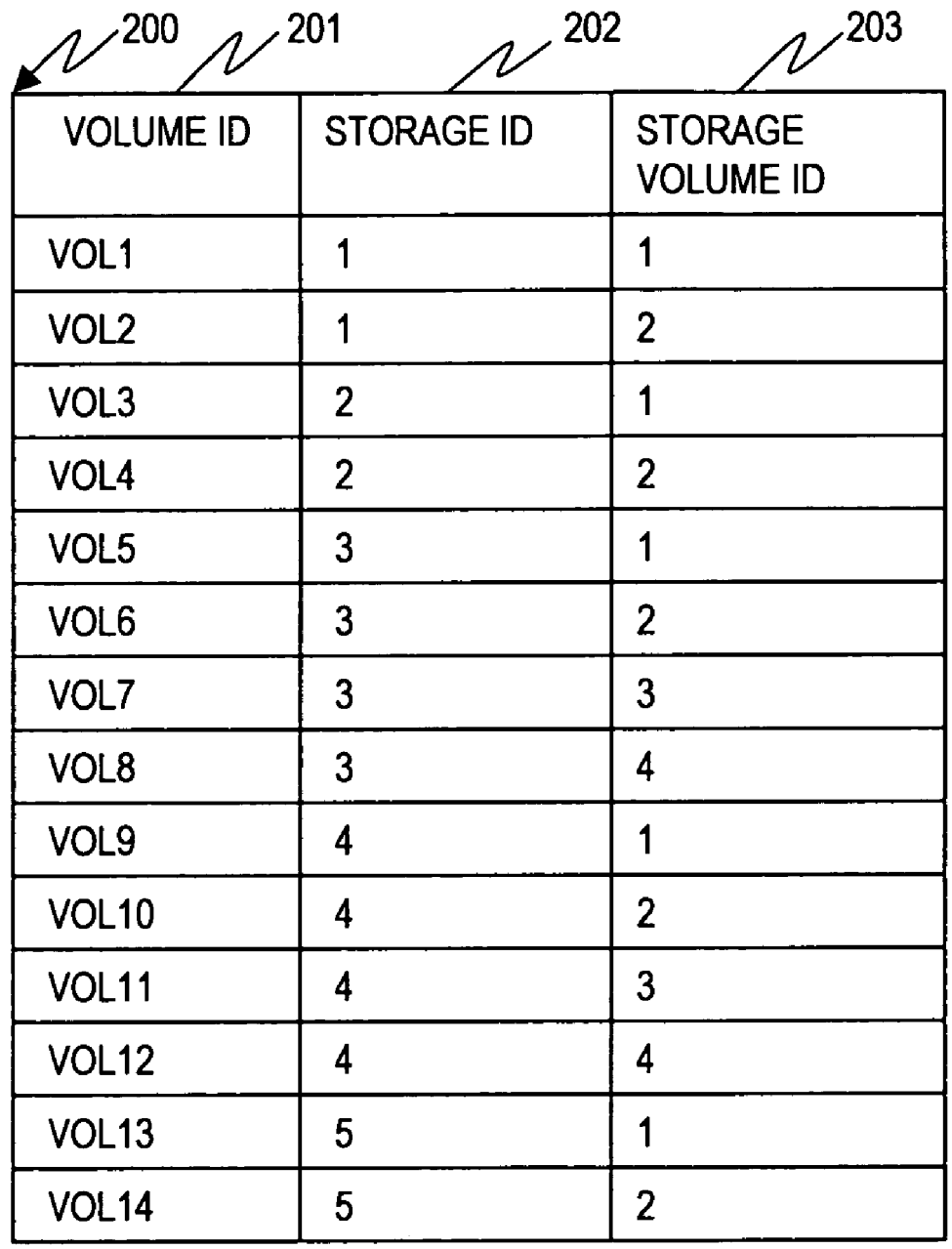
FIG. 17 is a configuration diagram of a volume table according to the second embodiment of this invention.

FIG. 17 is a configuration diagram of the volume table 200 according to the second embodiment of this invention.

The volume table 200 in the second embodiment has a configuration similar to that of the volume table 200 in the first embodiment, except that "VOL13" and "VOL14" here are the real volumes 154 of the intermediate storage 150.

Figure 18:
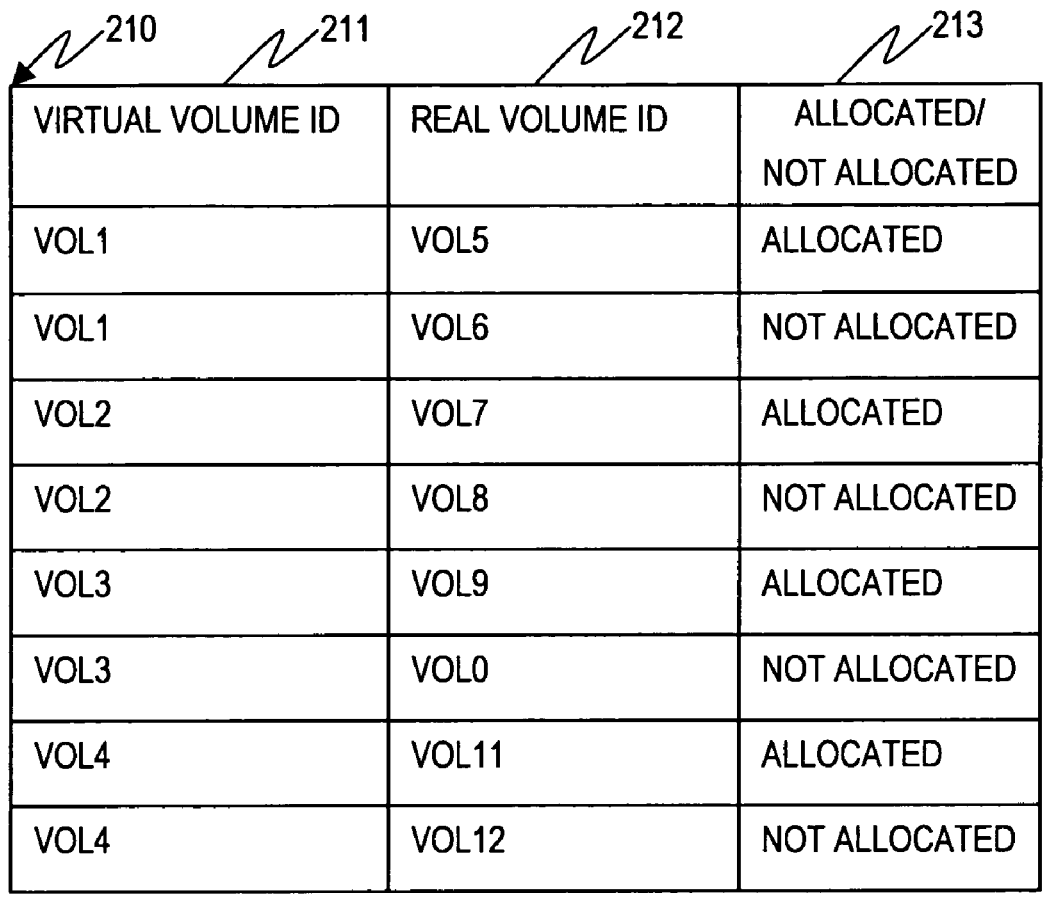
FIG. 18 is a configuration diagram of a real volume table according to the second embodiment of this invention.

FIG. 18 is a configuration diagram of the real volume table 210 according to the second embodiment of this invention.

The real volume table 210 has a configuration similar to that of the real volume table 210 in the first embodiment.

Figure 19:
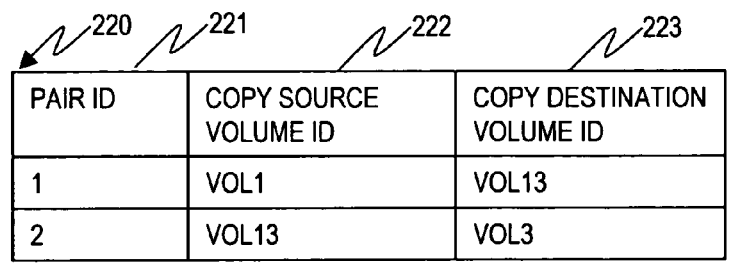
FIG. 19 is a configuration diagram of a pair volume table according to the second embodiment of this invention.

FIG. 19 is a configuration diagram of the pair volume table 220 according to the second embodiment of this invention.

The pair volume table 220 in the second embodiment has a configuration similar to that of the pair volume table 220 in the first embodiment. The difference is that, while the pair volume table 220 of the first embodiment holds one pair of volumes identified by the copy source volume ID 222 and the copy destination volume ID 223, plural such pairs are set in the pair volume table 220 of the second embodiment. This is because pair operation in the second embodiment is executed via the real volume 154.

Figure 20:
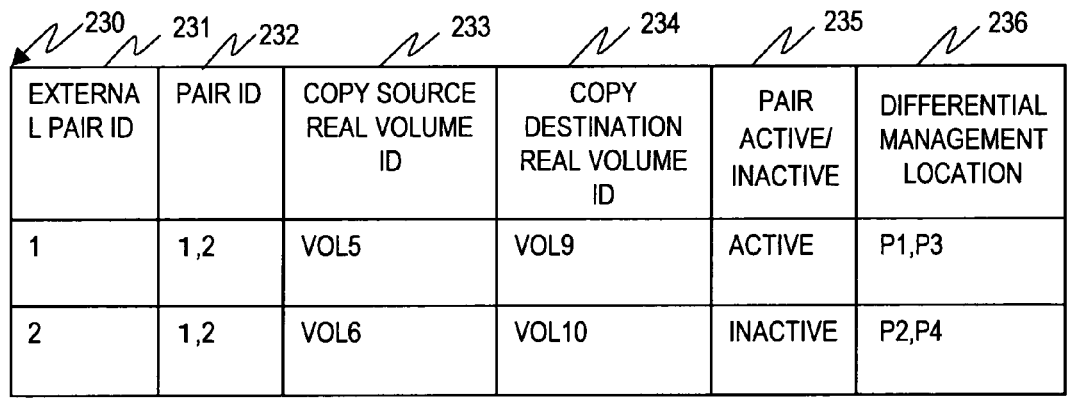
FIG. 20 is a configuration diagram of an external pair volume table according to the second embodiment of this invention.

FIG. 20 is a configuration diagram of the external pair volume table 230 according to the second embodiment of this invention.

The external pair volume table 230 in the second embodiment has a configuration similar to that of the external pair volume table 230 in the first embodiment.

Plural pairs are set in the pair volume table 220, so plural pair IDs are stored as the pair ID 232 and plural differential information pointers are stored as the differential management location 236.

With this construction, in performing pair operation on plural pairs of the real volumes 134, pairs identified by the pair ID 231 is put into use in accordance with information of every relevant volume pair. Therefore, pairs of the real volumes 134 can also be put into use.

Figure 21:
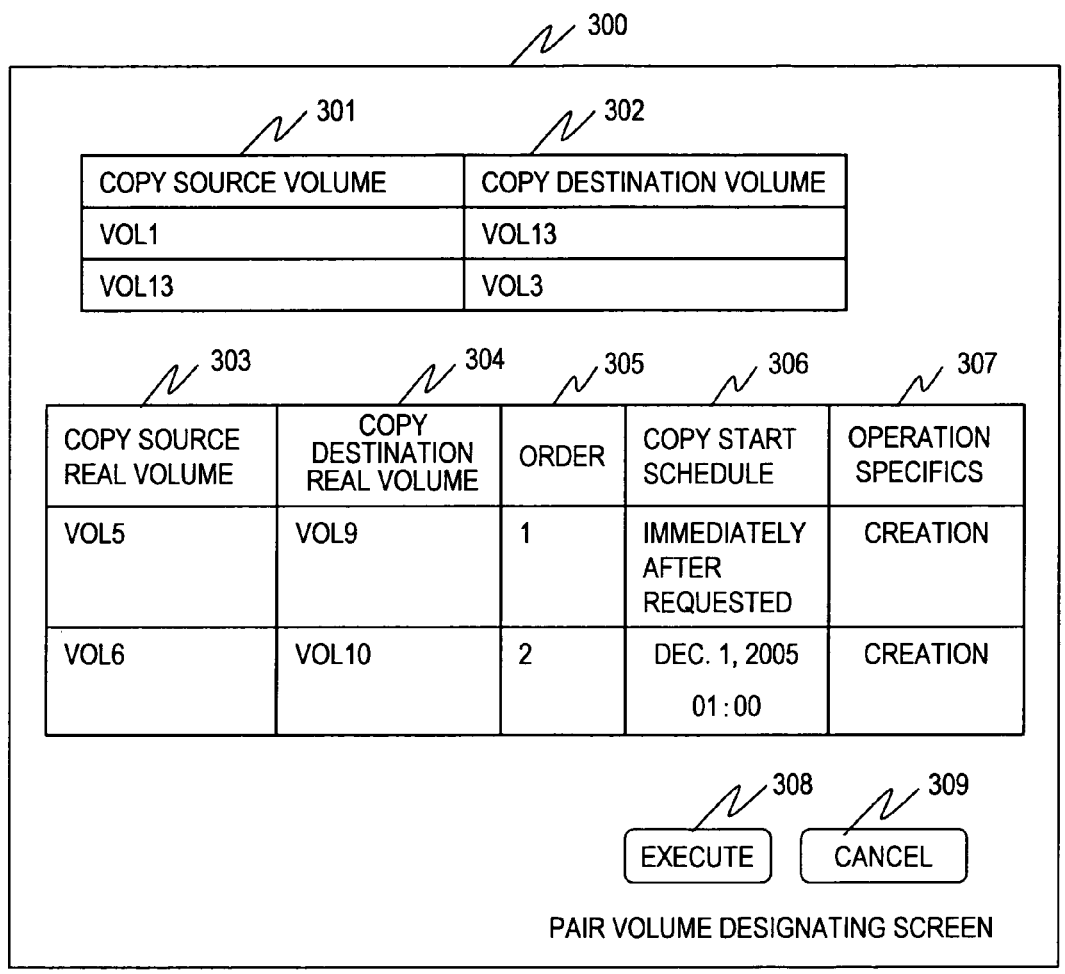
FIG. 21 is a configuration diagram of a pair volume designating screen according to the second embodiment of this invention.

FIG. 21 is a configuration diagram showing a pair volume designating screen 300 according to the second embodiment of this invention.

The configuration of the pair volume designating screen 300 in the second embodiment is the same as that in the first embodiment, except that the pair volume designating screen 300 of this embodiment allows a user to designate plural pairs of volumes as the copy source volume 301 and the copy destination volume 302.

In a first row cell for the copy destination volume 302 and a second row cell for the copy source volume 301, VOL13 which is the real volume 154 is designated.

This means that designated pair operation is executed using the real volume (VOL13).

The virtual volume 124 that is associated with the real volumes VOL5 and VOL6, which serve here as copy sources, is VOL1. The virtual volume 124 that is associated with the real volumes VOL9 and VOL10, which serve here as copy destinations, is VOL3.

Figure 22:
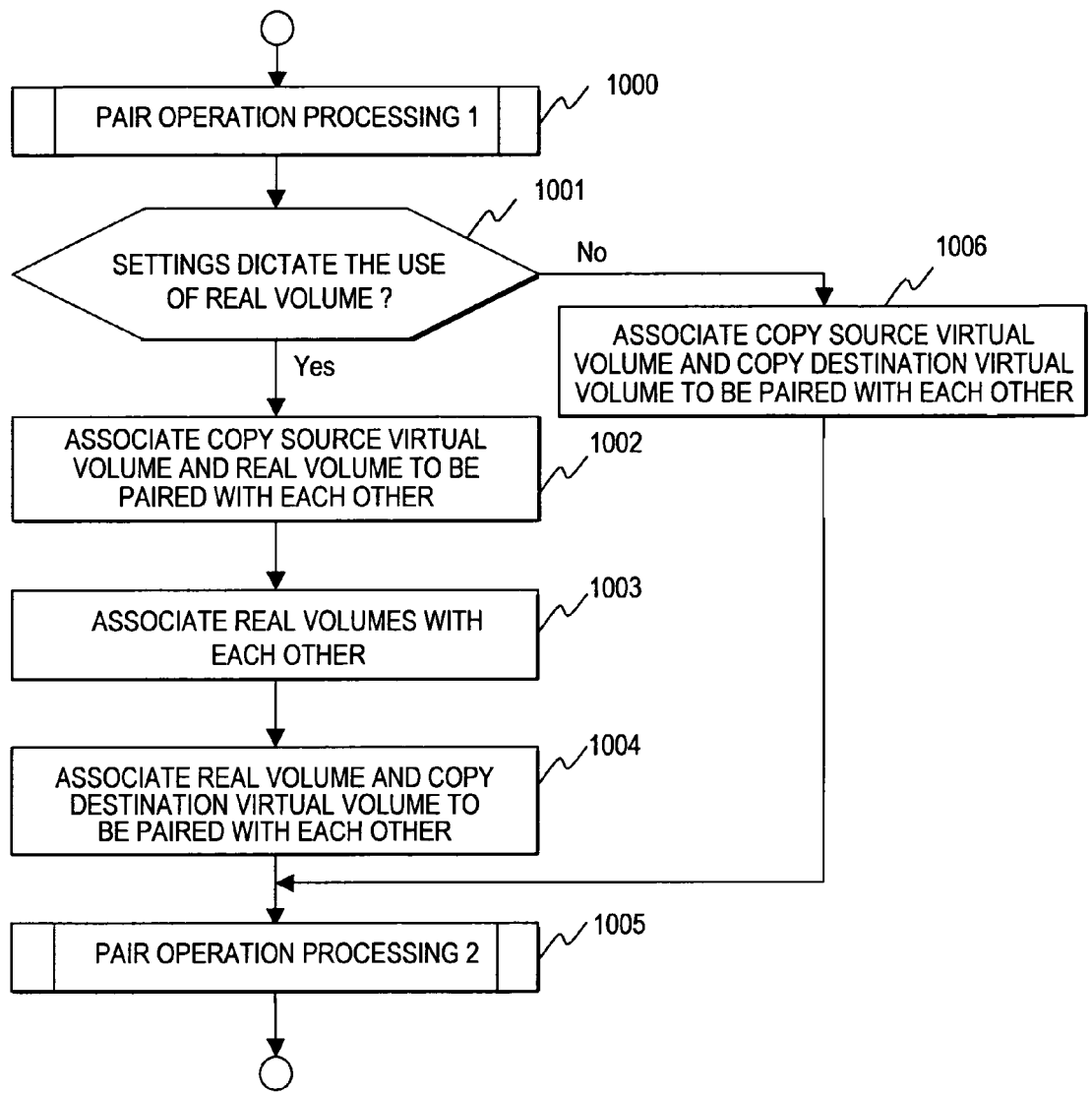
FIG. 22 is a flow chart for copy pair operation according to the second embodiment of this invention.

FIG. 22 is a flow chart for copy pair operation according to the second embodiment of this invention.

In FIG. 22, Step 1001 to Step 1004 and Step 1006 are executed by the real volume copy instructing program 105.

The real volume copy instructing program 105 executes pair operation processing 1 (Step 1000). The pair operation processing 1 is the same processing as Step 400 to Step 404 of the first embodiment and, when it is judged in Step 401 that the received request is not a pair creation request, is the same as Step 411 to Step 413.

The received pair operation request includes information on the copy source volume 301, the copy destination volume 302, the copy source real volume 303, the copy destination real volume 304, the order 305, the copy start schedule 306 and the operation specifics 307 that are specified by the user. The user can use a GUI (Graphical User Interface) like the pair volume designating screen 300 shown in FIG. 21 or a CLI (Command Line Interface) in making a copy operation request.

When a pair operation request does not specify the copy source volume 301, or when the designated real volume 134 cannot be allocated to the designated virtual volume 124, the real volume copy instructing program 105 may reject this pair operation request as error. In the case where a condition has to be met to replicate a storage (for example, a condition requiring the real volume 134 that serves as a copy source and the real volume 134 that serves as a copy destination to have the same capacity), the real volume copy instructing program 105 asks the storage system 120 about the state of the designated real volume 134. When the copy condition is not fulfilled, the real volume copy instructing program 105 may reject the pair operation request as error.

Next, the real volume copy instructing program 105 judges whether or not the requested pair operation uses the real volume 154 (Step 1001). The real volume 154 here is the real volume 154 that is placed in the intermediate storage 150.

To be specific, the real volume copy instructing program 105 judges whether or not the real volumes 154 are designated as the copy source volume 301 and the copy destination volume 302 in the pair operation request. When the real volumes 154 are included in the request, the processing proceeds to Step 1002. When the real volumes 154 are not included in the request, the requested processing is the same as the one in the first embodiment, and the next step is accordingly Step 1006.

In Step 1002, the real volume copy instructing program 105 associates the virtual volume 124 that serves as a copy source with the real volume 154. The volume (VOL1) serving as a copy source is associated with and paired with VOL13 as designated on the pair volume designating screen 300 shown in FIG. 21.

The real volume copy instructing program 105 then associates the real volumes 154 with each other when there are plural real volumes 154 (Step 1003). In the case where there is only one real volume 154, Step 1003 is not executed. According to the settings of the pair volume designating screen 300 which are shown as an example in FIG. 21, there is only one real volume 154 and therefore Step 1003 is not executed.

In Step 1004, the real volume copy instructing program 105 associates the real volume 154 with the real volume 134 that serves as a copy destination. The volume (VOL13) is associated with and paired with VOL3 serving as a copy destination as designated on the pair volume designating screen 300 shown in FIG. 21.

Next, the real volume copy instructing program 105 executes pair operation processing 2 (Step 1005). The pair operation processing 2 corresponds to Step 406 to Step 410 of the first embodiment.

However, the real volume copy instructing program 105 of the second embodiment instructs, in Step 409 of the first embodiment, to sequentially perform pair operation on pairs that are formed in Step 1002, Step 1003 and Step 1004 by associating volumes.

When the pair volume designating screen 300 is set as shown in FIG. 21, the real volume copy instructing program 105 confirms in Step 406 that pair operation is executed first for the pair composed of the real volumes VOL5 and VOL6, confirms in Step 407 that the real volume (VOL5) is allocated to the virtual volume (VOL1), confirms in Step 408 that the real volume (VOL9) is allocated to the virtual volume (VOL3), gives an instruction in Step 409 to perform pair operation on the pair composed of the virtual volume (VOL1) and the real volume (VOL13), and then an instruction to perform pair operation on the pair composed of the real volume (VOL13) and the virtual volume (VOL3), and stores information in the pair volume table 220 and the external pair volume table 230.

Finding out in Step 410 that pair operation has not been executed for the real volumes VOL6 and VOL10, the real volume copy instructing program 105 returns to Step 407. The real volume copy instructing program 105 allocates in Step 407 the real volume (VOL9) to the virtual volume (VOL1), allocates in Step 408 the real volume (VOL10) to the virtual volume (VOL3), gives an instruction in Step 409 to perform pair operation on the pair composed of the virtual volume (VOL1) and the real volume (VOL13), and then an instruction to perform pair operation on the pair composed of the real volume (VOL13) and the virtual volume (VOL3), and stores information in the pair volume table 220 and the external pair volume table 230. Judging in Step 410 that there is no pair left to receive pair operation, the real volume copy instructing program 105 ends the processing.

In this embodiment, pair operation is executed first between the virtual volume 124 serving as a copy source and the real volume 154 of the intermediate storage 150, then between the real volumes 154, and lastly between the real volume 154 and the virtual volume 124 serving as a copy destination in order to perform pair operation on the real volume 134 serving as a copy source and the real volume 134 serving as a copy destination. This makes it possible to perform pair operation on a copy pair of the real volumes 134 through other plural pairs.

A modification example of the second embodiment of this invention will be described with reference to FIG. 23. Components common to the first and the second embodiments and the modification example will be denoted by the same reference symbols to avoid repeating their descriptions.

This modification example does not use the backup host computer 140 in copying data that is stored in the copy source real volume 154 to the copy destination real volume 124 via the real volume 154.

Figure 23:
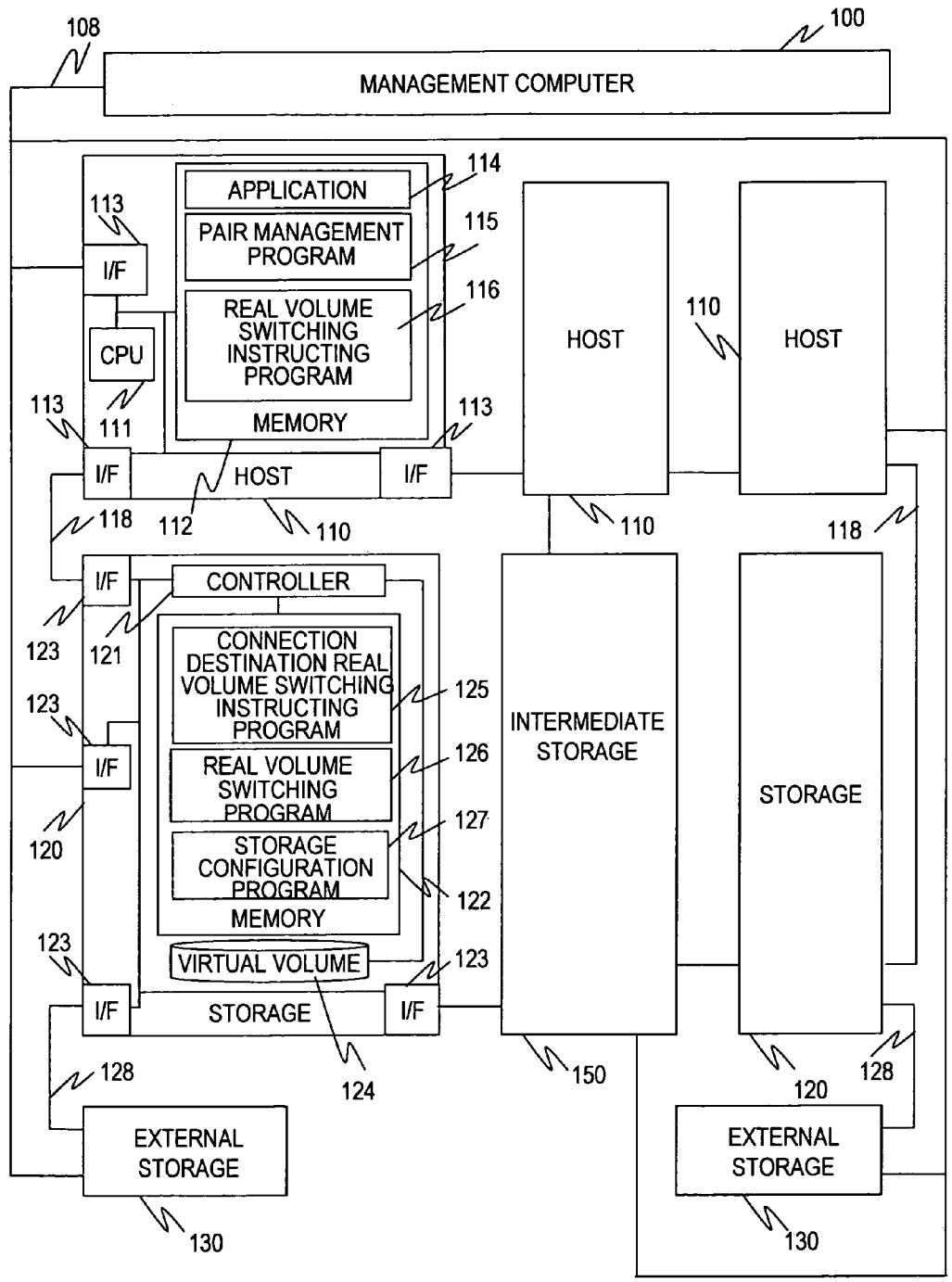
FIG. 23 is a configuration diagram showing a computer system according to a modification example of the second embodiment of this invention.

FIG. 23 is a configuration diagram showing a computer system according to the modification example of the second embodiment of this invention.

The management computer 100, the host computer 110, the storage system 120, the external storage system 130 and the internal storage 150 in this modification example are the same as those in the second embodiment.

The intermediate storage 150 of this modification example is connected directly to the host computer 110 and both storage systems 120.

As in the second embodiment, a pair composed of the virtual volume 124 and a real volume is managed with the pair volume table 220 and a pair of the real volumes 134 is managed with the real volume table 230 in this modification example.

Pair operation processing in this modification example is mostly the same as the one in the second embodiment. While the second embodiment uses the backup program 145 in providing information on a pair composed of the virtual volume 124 and the real volume 154 to the management computer 100, this modification example uses the storage system 120 in providing information on a pair composed of the virtual volume 124 and the real volume 154 to the management computer 100.

According to the representative embodiment of this invention, in the case where a virtual volume that is allocated to a real volume is designated as a copy source virtual volume in volume data copy processing, a virtual volume that is allocated to a real volume is selected or created as a copy destination virtual volume like the copy source virtual volume. After whether or not the copy source virtual volume and the copy destination virtual volume are respectively allocated to real volumes is checked, copy processing is executed between the copy source and copy destination virtual volumes and thus copy processing can be carried out separately for each real volume.

In the case where copy processing is executed for one copy source real volume and subsequently for another copy source real volume, a copy source destination virtual volume is also allocated to a copy destination real volume in addition to allocating a copy source virtual volume to the one copy source real volume and then to the other copy source real volume. In this way, data of a real volume allocated to a copy source virtual volume can be copied to one copy destination real volume and then to another copy destination real volume.

An interface for designating real volumes as a copy source and a copy destination is provided, and a storage that has virtual volumes sets volume copy as designated through the interface.

The interface may be for designating virtual volumes as a copy source and a copy destination. In this case, a real volume that has not received copy processing is selected and copy processing is executed for the selected real volume. The copy between real volumes is kept not only in one-on-one volume copy processing but also in data copy processing among plural volumes.

The representative embodiment of this invention provides a copy method that takes into account the replication relation between real volumes, and thus makes it possible to carry out copy processing separately for each real volume. Further, plural real volumes associated with and allocated, one at a time, to a virtual volume can be replicated automatically since switching is made automatically from one of the real volumes to another of the real volumes after copy of the former real volume is finished.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
at least one first storage system;
at least one second storage system connected to the first storage system;
a host computer; and
a management computer which manages the first storage system and the second storage system,
wherein the first storage system comprises a first interface for connecting with the second storage system, a first processor connected to the first interface, and a real storage area for storing data that is requested to be written in a virtual storage area set in the second storage system,
wherein the second storage system comprises a second interface for connecting with the host computer and the first storage system, a second processor connected to the second interface, and a second memory connected to the second processor to provide the host computer with the virtual storage area in which data is written,
wherein the virtual storage area is associated with the real storage area,
wherein, when the real storage area is allocated to the virtual storage area, the real storage area stores data that is requested to be written in the allocated virtual storage area,
wherein the management computer comprises a third interface connected to the first storage system and the second storage system, a third processor connected to the third interface and a third memory connected to the third processor, and
wherein, upon receiving a copy request that designates the real storage area as a copy source real storage area, the third processor:
selects one virtual storage area that is associated with plural real storage areas as a copy destination virtual storage area;
upon judging that the copy source real storage area is not allocated to a copy source virtual storage area but is associated with the copy source virtual storage area, switches copy source allocation from one real storage area to the copy source real storage area, and switches copy destination allocation from one real storage area to another real storage area associated with the copy destination virtual storage area, in accordance with the copy source allocation switching;
instructs, based on a result of the judging, to copy data that is stored in the copy source real storage area to a copy destination real storage area,
stores, in the third memory, copy pair information about a replication relation between the copy source real storage area and the copy destination real storage area on which the data copy has been performed.

2. The computer system according to claim 1, wherein, upon judging that a virtual storage area is not allocated to one of the copy source real storage area and the copy destination real storage area, the third processor:

instructs to copy data that is stored in the copy source real storage area to the copy destination real storage area through direct data transfer between the first storage system; and stores, in the third memory, copy pair information about the replication relation between the copy source real storage area and the copy destination real storage area on which the data copy has been performed.

3. The computer system according to claim 1, wherein, upon judging that a virtual storage area is not allocated to one of the copy source real storage area and the copy destination real storage area, the third processor:

allocates one virtual storage area of the second storage system to the copy source real storage area of the first storage system and creates the copy source virtual storage area, allocates one virtual storage area of the second storage system to the copy destination real storage area of the first storage system and creates the copy destination virtual storage area, instructs to copy data that is stored in the copy source virtual storage area to the copy destination virtual storage area, and stores, in the third memory, copy pair information about the replication relation between the copy source real storage area and the copy destination real storage area on which the data copy has been performed.

4. The computer system according to claim 1, further comprising a third storage system, which is connected to the first storage system and the second storage system and which has a third storage area, wherein the third processor instructs, based on a result of the judging, to copy data that is stored in the copy source real storage area to the copy destination real storage area through the third storage area, and stores, in the third memory, copy pair information about the replication relation between the copy source real storage area and the copy destination real storage area on which the data copy has been performed.

5. The computer system according to claim 1, wherein the second storage system stores differential information which is a difference between data stored in the copy source real storage area and data stored in the copy destination real storage area, and wherein the third processor instructs to copy data that is stored in the copy source real storage area to the copy destination real storage area using the differential information.

6. The computer system according to claim 1, wherein the third processor switches allocation from one copy destination real storage area to another copy destination real storage area in accordance with one of an order and schedule of switching between real storage areas that are associated with the copy source virtual storage area, and in accordance with the switching from one copy source real storage area to another copy source real storage area.

7. The computer system according to claim 1, the copy source virtual storage area and the copy destination virtual storage area are included in the same second storage system.

8. The computer system according to claim 1, wherein, when a virtual storage area associated with plural real storage areas included in the first storage system cannot be chosen as the copy destination virtual storage area, the third processor creates a new virtual storage area and uses the created virtual storage area as a copy destination virtual storage area.

9. A management computer for managing a computer system that has at least one first storage system, at least one second storage system connected to the first storage system, and a host computer, the first storage system having a first interface for connecting with the second storage system, a first processor connected to the first interface, and a real storage area for storing data that is requested to be written in a virtual storage area set in the second storage system, the second storage system having a second interface for connecting with the host computer and the first storage system, a second processor connected to the second interface, and a second memory connected to the second processor to provide the host computer with the virtual storage area in which data is written, the virtual storage area being associated with the real storage area, the real storage area, when allocated to the virtual storage area, storing data that is requested to be written in the allocated virtual storage area, the management computer comprising a third interface connected to the first storage system and the second storage system, a third processor connected to the third interface, and a third memory connected to the third processor, wherein the third memory stores storage management information, which shows whether the real storage area is allocated to the virtual storage area or not, and wherein the management computer comprises a switching instructing module and a copy instructing module, the switching instructing module refers to the storage management information;

switches, upon judging that a copy source real storage area is not allocated to the copy source virtual storage area but is associated with a copy source virtual storage area, copy source allocation from one real storage area to the copy source real storage area; and switches copy destination allocation from one real storage area to another real storage area associated with a copy destination virtual storage area, in accordance with the copy source allocation switching, and the copy instructing module instructs, based on a result of the judging, to copy data that is stored in the newly allocated copy source real storage area to the newly allocated copy destination real storage area, and stores, in the third memory, copy pair information about a replication relation between the copy source real storage area and the copy destination real storage area on which the data copy has been performed.

10. The management computer according to claim 9, wherein the second storage system stores differential information which is a difference between data stored in the copy source real storage area and data stored in the copy destination real storage area, and wherein the copy instructing module instructs to copy data that is stored in the copy source real storage area to the copy destination real storage area using the differential information.

11. The management computer according to claim 9, wherein the switching instructing module switches allocation from one copy destination real storage area to another copy destination real storage area in accordance with one of an order and schedule of switching between real storage areas that are associated with the copy source virtual storage area, and in accordance with the switching from one copy source real storage area to another copy source real storage area.

12. The management computer according to claim 9, wherein, when a virtual storage area associated with plural real storage areas included in the first storage system cannot be chosen as the copy destination virtual storage area, the copy instructing unit creates a new virtual storage area and uses the created virtual storage area as a copy destination virtual storage area.

13. A management method for a storage area in a computer system,
- the computer system comprising: a first storage system; a second storage system connected to the first storage system; a host computer; and a management computer which manages the first storage system and the second storage system,
- wherein the second storage system includes a virtual storage area which provides the host computer with a virtual storage area in which data is written by the host computer,
- wherein the virtual storage area is associated with a real storage area included in the first storage system,
- wherein, when allocated to the virtual storage area, the real storage area stores data that is requested to be written in the allocated virtual storage area,
- the management method comprising the steps of:
- selecting, upon receiving a copy request, one virtual storage area included in the second storage system, which is associated with plural real storage areas included in the first storage system, as a copy destination virtual storage area,
- switching, upon judging that a copy source real storage area is not allocated to a virtual storage area but is associated with a copy source virtual storage area, copy source allocation from one real storage area to another real storage area,
- switching copy destination allocation from one real storage area to another real storage area associated with the copy destination virtual storage area, in accordance with the copy source allocation switching,
- instructing to copy data that is stored in the newly allocated copy source real storage area to the newly allocated copy destination real storage area, and
- storing, in a memory of the management computer, copy pair information about a replication relation between the copy source real storage area and the copy destination real storage area on which the data copy has been performed.

14. The management method according to claim 13, further comprising the steps of:
- storing differential information which is a difference between data stored in the copy source real storage area and data stored in the copy destination real storage area, and
- instructing to copy data that is stored in the copy source real storage area to the copy destination real storage area using the differential information.

15. The management method according to claim 13, further comprising the step of, in the allocation switching phase, the allocation switching from one copy destination real storage area to another is performed in accordance with one of an order and schedule of switching between real storage areas that are associated with the copy source virtual storage area, and in accordance with the switching from one copy source real storage area to another copy source real storage area.

16. The management method according to claim 13, wherein, in the allocation switching phase, when a real storage area associated with plural real storage areas included in the first storage system cannot be chosen as the copy destination virtual storage area, creating a new virtual storage area and using the created virtual storage area as a copy destination virtual storage area.

* * * * *